(12) United States Patent
Miura

(10) Patent No.: US 11,002,200 B2
(45) Date of Patent: May 11, 2021

(54) EVAPORATED FUEL PROCESSING DEVICE

(71) Applicant: HAMANAKODENSO CO., LTD., Kosai (JP)

(72) Inventor: Yuuichirou Miura, Kariya (JP)

(73) Assignee: HAMANAKODENSO CO., LTD., Kosai (JP)

( * ) Notice: Subject to any disclaimer, the term of this patent is extended or adjusted under 35 U.S.C. 154(b) by 0 days.

(21) Appl. No.: 16/922,338

(22) Filed: Jul. 7, 2020

(65) Prior Publication Data

US 2021/0010432 A1 Jan. 14, 2021

(30) Foreign Application Priority Data

Jul. 12, 2019 (JP) .............................. JP2019-130501

(51) Int. Cl.
| | | |
|---|---|---|
| *F02D 41/00* | (2006.01) | |
| *B60K 15/03* | (2006.01) | |
| *F02M 25/08* | (2006.01) | |
| *F02M 35/10* | (2006.01) | |
| *B01D 53/04* | (2006.01) | |

(52) U.S. Cl.
CPC ....... *F02D 41/004* (2013.01); *B01D 53/0415* (2013.01); *B60K 15/03* (2013.01); *F02M 25/0836* (2013.01); *F02M 25/0854* (2013.01); *F02M 35/10222* (2013.01); *B01D 2253/102* (2013.01); *B60K 2015/0321* (2013.01)

(58) Field of Classification Search
CPC .............. F02D 41/004; B01D 53/0415; B01D 2253/102; B60K 15/03; B60K 2015/0321; F02M 25/0836; F02M 25/0854; F02M 35/10222
USPC ................................ 123/519, 516, 518, 520
See application file for complete search history.

(56) References Cited

U.S. PATENT DOCUMENTS

2015/0159566 A1 6/2015 Akita et al.

*Primary Examiner* — Mahmoud Gimie
(74) *Attorney, Agent, or Firm* — Nixon & Vanderhye P.C.

(57) ABSTRACT

An evaporated fuel processing device includes a relationship learning unit that, during a learning operation, learns the relationship between a valve opening start amount and a pressure difference. In particular, the relationship learning unit learns this relationship when a valve opening detection unit detects a plurality of different valve opening start amounts and a pressure difference detection unit detects a plurality of different pressure differences. Then, the relationship learning unit creates a relationship map between the valve opening start amount and the pressure difference. The evaporated fuel processing device then corrects the valve opening start amount based on this relationship map.

8 Claims, 15 Drawing Sheets

EVAPORATED FUEL PROCESSING DEVICE

CROSS REFERENCE TO RELATED APPLICATION

The present application claims the benefit of priority from Japanese Patent Application No. 2019-130501 filed on Jul. 12, 2019. The entire disclosure of the above application is incorporated herein by reference.

TECHNICAL FIELD

The present disclosure relates to an evaporated fuel processing device provided in a vehicle.

BACKGROUND

An evaporated fuel processing device may be configured to purge evaporated fuel in a fuel tank to other places, such as into a canister filled with an adsorbent material.

SUMMARY

In one aspect of the present disclosure, an evaporated fuel processing device provided in a vehicle having an internal combustion engine and a fuel tank for processing evaporated fuel evaporated in the fuel tank, includes a canister including an adsorbent for adsorbing evaporated fuel, a sealing valve provided in a first purge pipe connecting the fuel tank to the canister, the sealing valve being configured to be operated by an actuator to quantitatively adjust an opening degree for opening and closing the first purge pipe, a tank pressure sensor provided in the fuel tank configured to a tank side pressure in the fuel tank, a purge valve provided in a second purge pipe connecting the canister to an intake pipe of the internal combustion engine, the purge valve being configured to open and close the second purge pipe, a canister side pressure detector configured to detect or estimate a canister side pressure generated on the canister side with respect to the sealing valve, and a controller configured to selectively execute each of: a sealing operation in which the first purge pipe is closed by the sealing valve to seal the fuel tank, a first purge operation in which the first purge pipe is opened by the sealing valve to purge the evaporated fuel in the fuel tank into the canister, a second purge operation in which the second purge pipe is opened by the purge valve to purge fuel components in the canister into the intake pipe, a third purge operation in which the first purge pipe is opened by the sealing valve and at the same time the second purge pipe is opened by the purge valve to purge the evaporated fuel in the fuel tank into the intake pipe via the canister, and a learning operation in which an opening degree of the sealing valve is learned during at least one of the first purge operation or the third purge operation, wherein the controller includes: an opening degree command unit that transmits an opening degree command amount, which determines the opening degree of the sealing valve, to the actuator, a valve opening detection unit that, while the opening degree command amount is gradually increased from zero, determines the opening degree command amount has reached a valve opening start amount when the tank side pressure begins to decrease, a pressure difference detection unit that detects a pressure difference between the tank side pressure and the canister side pressure when the opening degree command amount reaches the valve opening start amount, and also detects the pressure difference when the first purge pipe is opened by the sealing valve, a relationship learning unit that, during the learning operation, learns a relationship between the valve opening start amount and the pressure difference when the valve opening detection unit detects a plurality of different valve opening start amounts and the pressure difference detection unit detects a plurality of different pressure differences, and then creates a relationship map between the valve opening start amount and the pressure difference, and an opening degree correction unit that, during at least one of the first purge operation or the third purge operation, detects a starting pressure difference as the pressure difference detected by the pressure difference detection unit at the time when the first purge pipe is opened by the sealing valve, checks the starting pressure difference against the relationship map to read a starting valve opening start amount which is the valve opening start amount corresponding to the starting pressure difference, and corrects the opening degree command amount from the opening degree command unit using the starting valve opening start amount.

In another aspect of the present disclosure, an evaporated fuel processing device provided in a vehicle having an internal combustion engine and a fuel tank for processing evaporated fuel evaporated in the fuel tank, includes a canister including an adsorbent for adsorbing evaporated fuel, a sealing valve provided in a first purge pipe connecting the fuel tank to the canister, the sealing valve being configured to be operated by an actuator to quantitatively adjust an opening degree for opening and closing the first purge pipe, a tank pressure sensor provided in the fuel tank configured to a tank side pressure in the fuel tank, a purge valve provided in a second purge pipe connecting the canister to an intake pipe of the internal combustion engine, the purge valve being configured to open and close the second purge pipe, a canister side pressure detector configured to detect or estimate a canister side pressure generated on the canister side with respect to the sealing valve, and a controller configured to selectively execute each of: a sealing operation in which the first purge pipe is closed by the sealing valve to seal the fuel tank, a first purge operation in which the first purge pipe is opened by the sealing valve to purge the evaporated fuel in the fuel tank into the canister, a second purge operation in which the second purge pipe is opened by the purge valve to purge fuel components in the canister into the intake pipe, and a third purge operation in which the first purge pipe is opened by the sealing valve and at the same time the second purge pipe is opened by the purge valve to purge the evaporated fuel in the fuel tank into the intake pipe via the canister, wherein the controller includes: an opening degree command unit that transmits an opening degree command amount, which determines the opening degree of the sealing valve, to the actuator, a pressure difference detection unit that detects a pressure difference between the tank side pressure and the canister side pressure when the first purge pipe is opened by the sealing valve, a memory unit that stores a relationship map between the pressure difference $\Delta P$ and a valve opening start amount, the relationship map being created by detecting the valve opening start amount as the opening degree command amount when the tank side pressure begins to decrease while the opening degree command amount is gradually increased from zero, for a plurality of different pressure differences, and an opening degree correction unit that, during at least one of the first purge operation or the third purge operation, detects a starting pressure difference as the pressure difference detected by the pressure difference detection unit at the time when the first purge pipe is opened by the sealing valve, checks the starting pressure difference against the relationship map to read a starting valve opening start amount which is the valve opening start amount corresponding to the starting pressure difference, and corrects the opening degree command amount from the opening degree command unit using the starting valve opening start amount.

DETAILED DESCRIPTION

Figure 1:
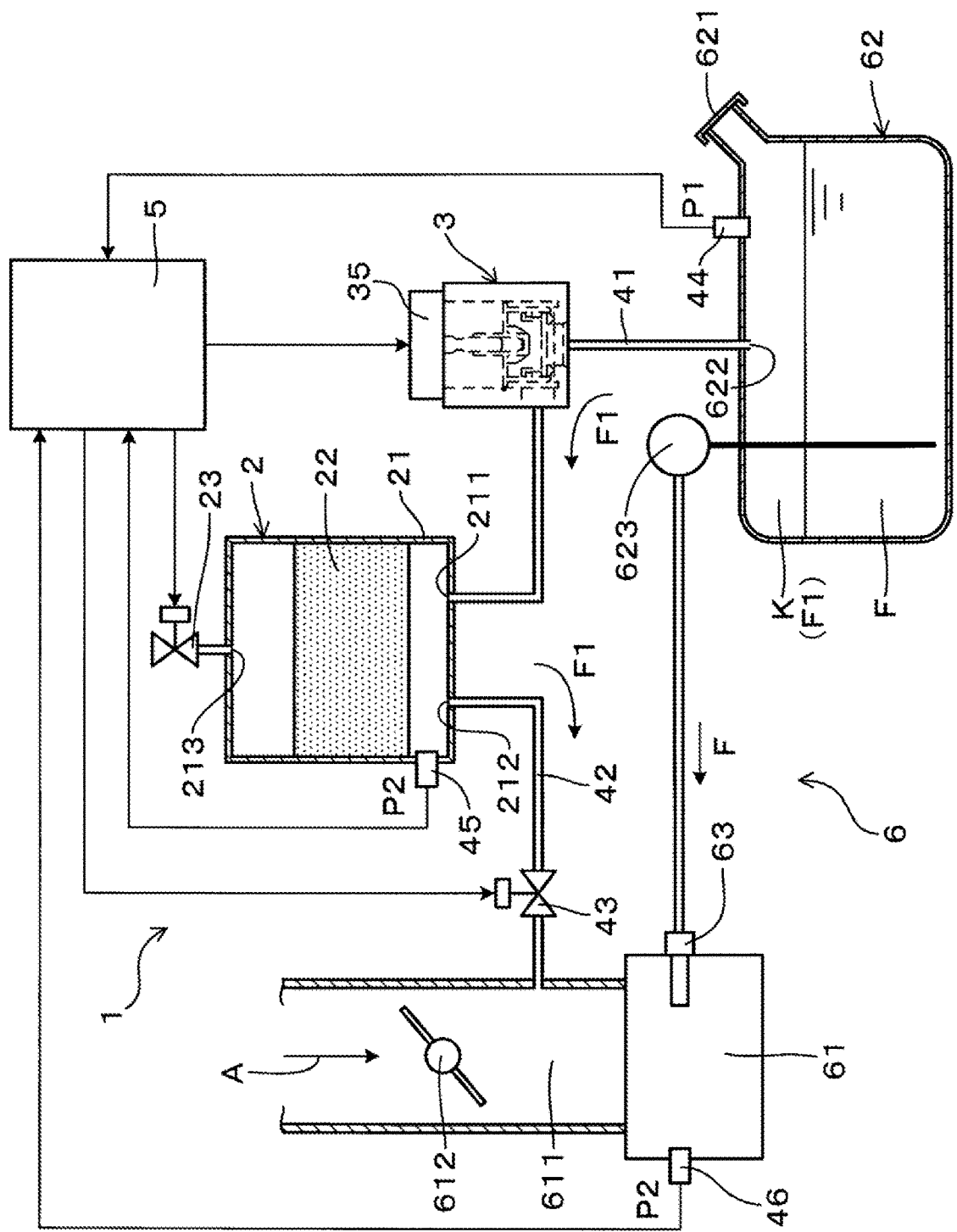
FIG. 1 is an explanatory diagram illustrating a part of a vehicle in which an evaporated fuel processing device according to a first embodiment is disposed.

A preferred embodiment of the above-described evaporated fuel processing device will be described with reference to the drawings.

First Embodiment

In a vehicle having an internal combustion engine, liquid fuel used for the internal combustion engine is stored in a fuel tank. The liquid fuel in the fuel tank has a vapor pressure that varies according to temperature. Further, among the various the gas phase elements in the fuel tank, a pressure is generated due to evaporated fuel or the like. When fuel is supplied to the fuel tank, in some cases it is preferable that evaporated fuel, which is part of the gas phase elements in the fuel tank, is not released to outside. In this case, an evaporated fuel processing device having a canister that adsorbs the evaporated fuel is used.

Then, before starting fuel supply to the fuel tank, a sealing valve provided in a purge pipe connecting the fuel tank to the canister is opened to adsorb the fuel vapor in the fuel tank into the adsorbent in the canister. The fuel components adsorbed by the adsorbent of the canister is supplied to the intake pipe of the internal combustion engine and used for combustion of the internal combustion engine. Further, the fuel vapor in the fuel tank may be supplied to the intake pipe of the internal combustion engine via the canister.

The sealing valve used in the evaporated fuel processing device is a normally closed valve that closes the purge pipe connecting the fuel tank to the canister. When a signal is sent from a controller to the actuator of the sealing valve, the purge pipe is opened by the sealing valve. The opening/closing operation of the purge pipe by the sealing valve can be performed in various manners, such as a simple open/close operation where the opening degree is not adjusted, an operation where the opening degree is adjustable to several levels (such as two levels), and an operation where the opening degree is quantitatively adjusted.

As an evaporated fuel processing device that quantitatively adjusts the opening degree of a sealing valve using a stepping motor, consider a comparative example as follows. In this comparative example evaporated fuel processing device, when the fuel tank is depressurized, the flow rate of gas flowing through the purge pipe from the fuel tank to the canister can be adjusted by changing a stroke amount of a closing valve as the sealing valve. Further, the closing valve in this evaporated fuel processing device is configured to learn the valve opening start position based on the stroke amount of a valve movable portion with respect to a valve seat in the valve opening direction when the internal pressure of the fuel tank drops by a predetermined value or more.

According to the comparative example evaporated fuel processing device, the opening start position of the closing valve is corrected in accordance with a change in the internal pressure of the fuel tank. However, it has been found that the valve opening start position, which is based on the stroke amount of the valve movable portion of the closing valve, also changes depending the pressure downstream of the closing valve, such as the internal pressure of the canister and the pressure in intake pipe of the internal combustion engine. According to the closing valve (sealing valve) of the comparative example evaporated fuel processing device, the internal pressure of the canister, the internal pressure of the intake pipe of the internal combustion engine, and the like are not taken into consideration. Accordingly, there remains room for improvement for more appropriately correcting the valve opening start position (valve opening start amount) of the valve. Therefore, in order to more appropriately quantitatively control the purge flow rate of the evaporated fuel from the fuel tank, further improvement is desired.

In this regard, the evaporated fuel processing device of the first embodiment is capable of more appropriately perform quantitative control for a purge flow rate of evaporated fuel from a fuel tank, as will become apparent from the following description.

As shown in FIG. 1, an evaporated fuel processing device 1 according to the present embodiment is provided in a vehicle 6. The vehicle 6 includes an internal combustion engine (engine) 61 and a fuel tank 62. The evaporated fuel processing device 1 is configured to process evaporated fuel F1 that has evaporated in the fuel tank 62. The evaporated fuel processing device 1 includes a canister 2, a first purge pipe 41, a sealing valve 3, a tank pressure sensor 44, a second purge pipe 42, a purge valve 43, canister side pressure detectors 45 and 56, and a controller 5.

The canister 2 includes an adsorbent 22 that adsorbs the evaporated fuel F1. The first purge pipe 41 connects the fuel tank 62 to the canister 2. The sealing valve 3 is provided in the first purge pipe 41 and includes a stepping motor 35 that acts as an actuator. The sealing valve 3 is configured to quantitatively adjust the opening degree of the first purge pipe 41 in accordance with operation of the stepping motor 35. The tank pressure sensor 44 is provided in the fuel tank 62 and detects a tank side pressure P1 in the fuel tank 62.

The second purge pipe 42 connects the canister 2 to an intake pipe 611 of the internal combustion engine 61. The purge valve 43 is provided in the second purge pipe 42 and is configured to open and close the second purge pipe 42. The canister side pressure detectors 45 and 56 are configured to detect or estimate a canister side pressure P2 generated on the canister 2 side with respect to the sealing valve 3.

Figure 9:
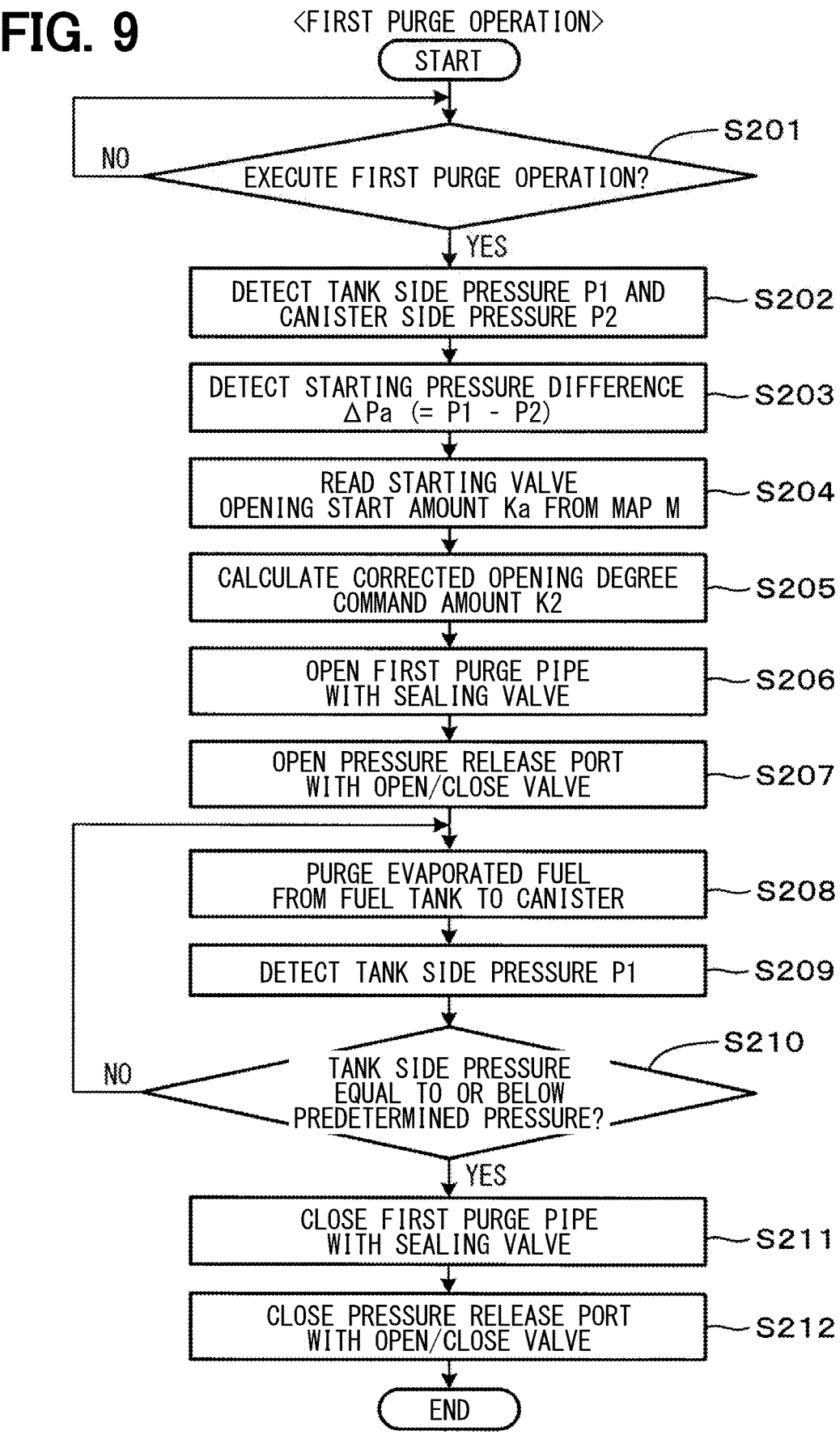
FIG. 9 is a flowchart illustrating a first purge operation according to the first embodiment.
Figure 10:
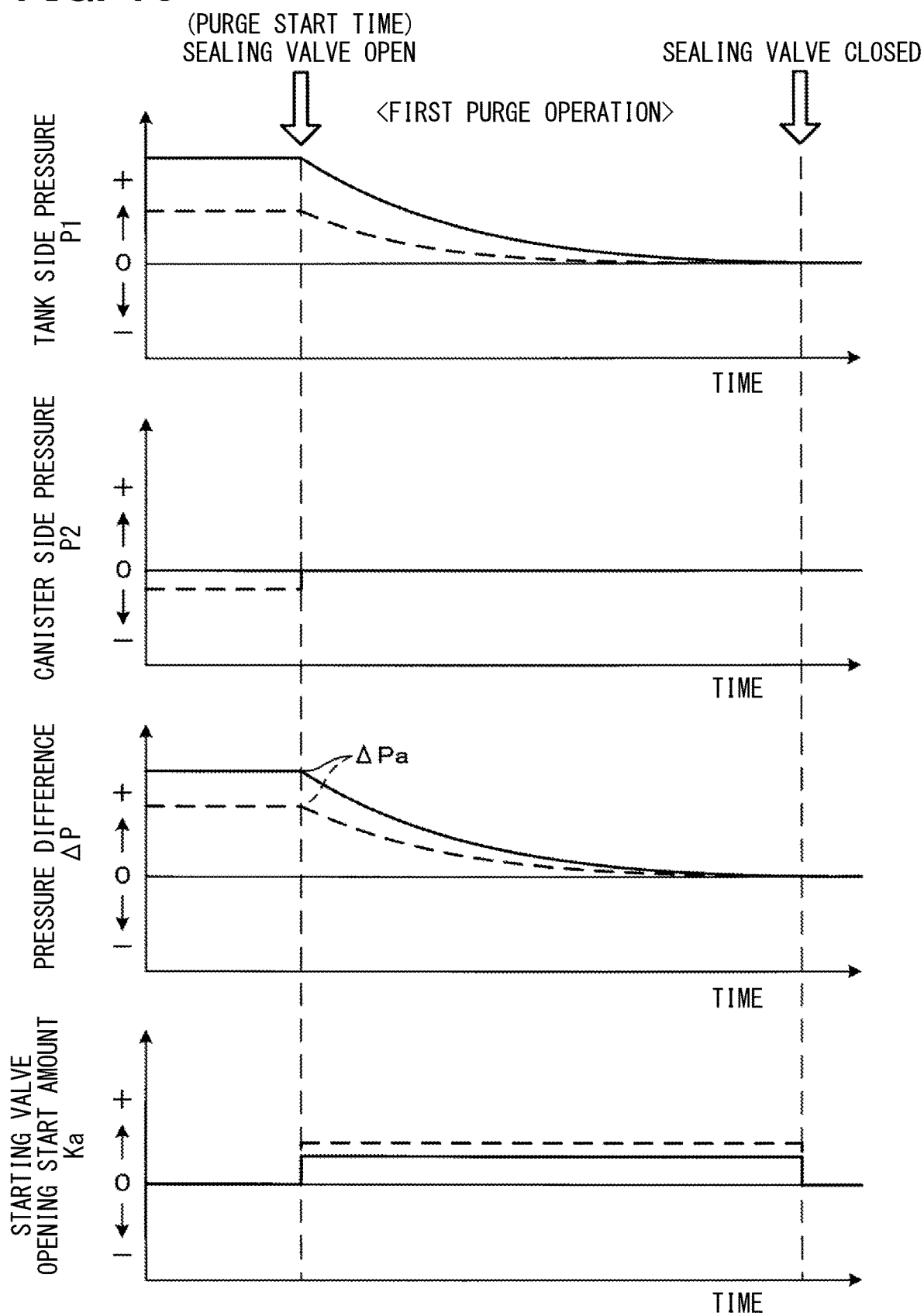
FIG. 10 is a graph showing change over time, during a first purge operation, for tank side pressure, canister side pressure, pressure difference between the tank side pressure and the canister side pressure, and starting valve opening start amount.

The controller 5 is configured to execute each of a sealing operation, a first purge operation (depressurizing operation) 501, a second purge operation 502, a third purge operation 503, and a learning operation 504. The sealing operation is an operation in which the first purge pipe 41 is closed by the sealing valve 3 to seal the fuel tank 62. The first purge operation 501 is an operation in which the first purge pipe 41 is opened by the sealing valve 3 and the evaporated fuel F1 in the fuel tank 62 is purged into the canister 2, as shown in FIGS. 9 and 10. The second purge operation 502 is an operation in which the second purge pipe 42 is opened by the purge valve 43 and fuel components in the canister 2 are purged into the intake pipe 611, as shown in

FIG. 11.

Figure 7:
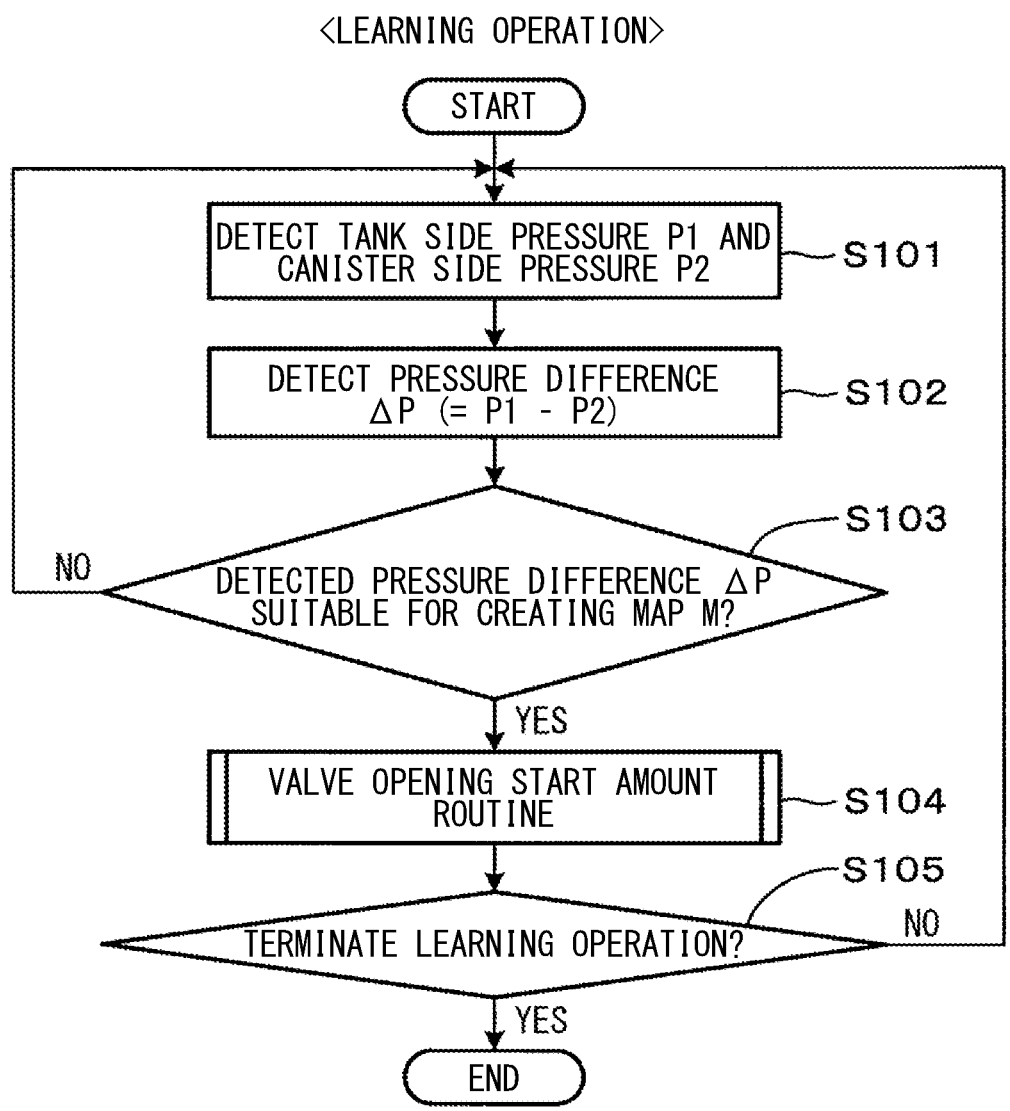
FIG. 7 is a flowchart illustrating a learning operation according to the first embodiment.
Figure 8:
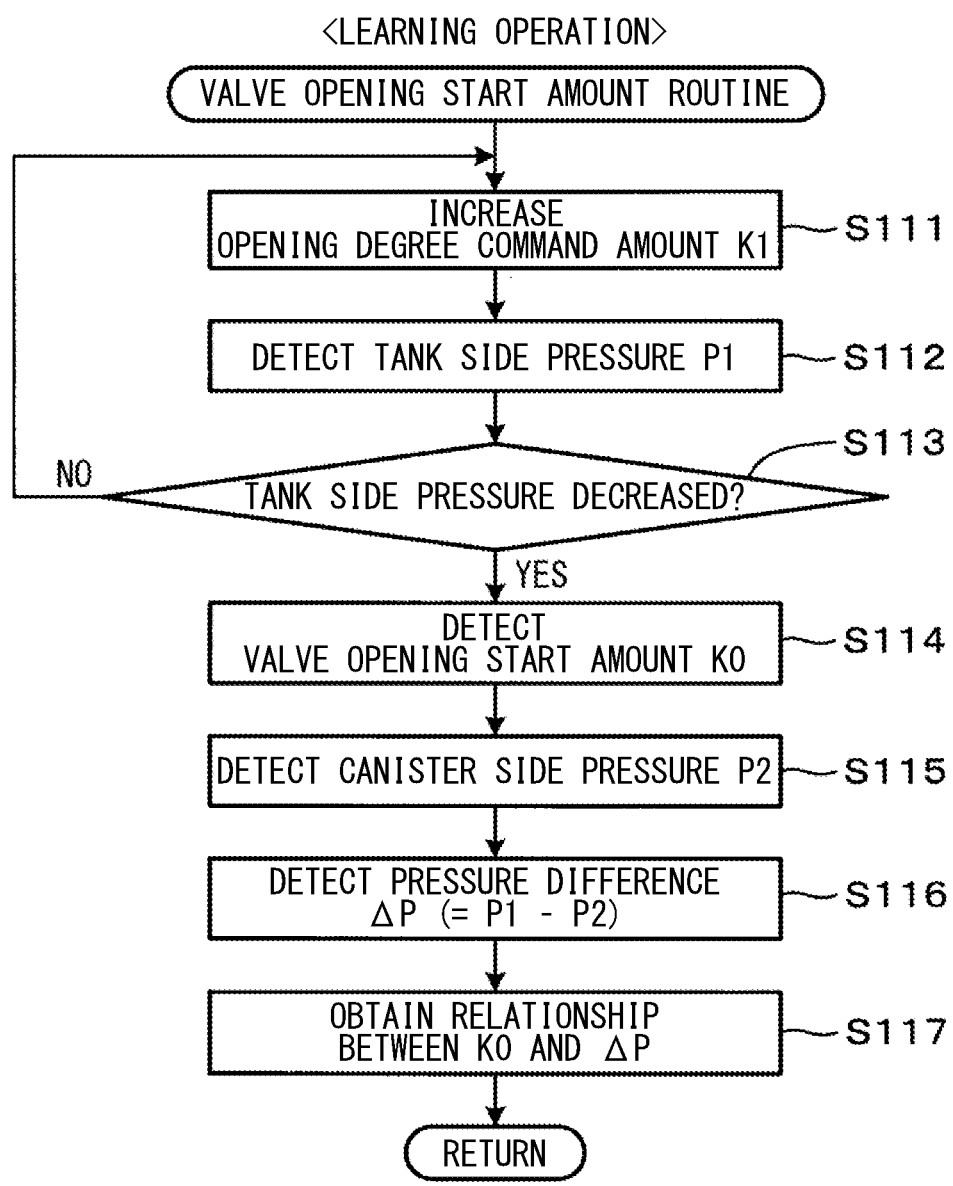
FIG. 8 is a flowchart illustrating a learning operation according to the first embodiment.
Figure 12:
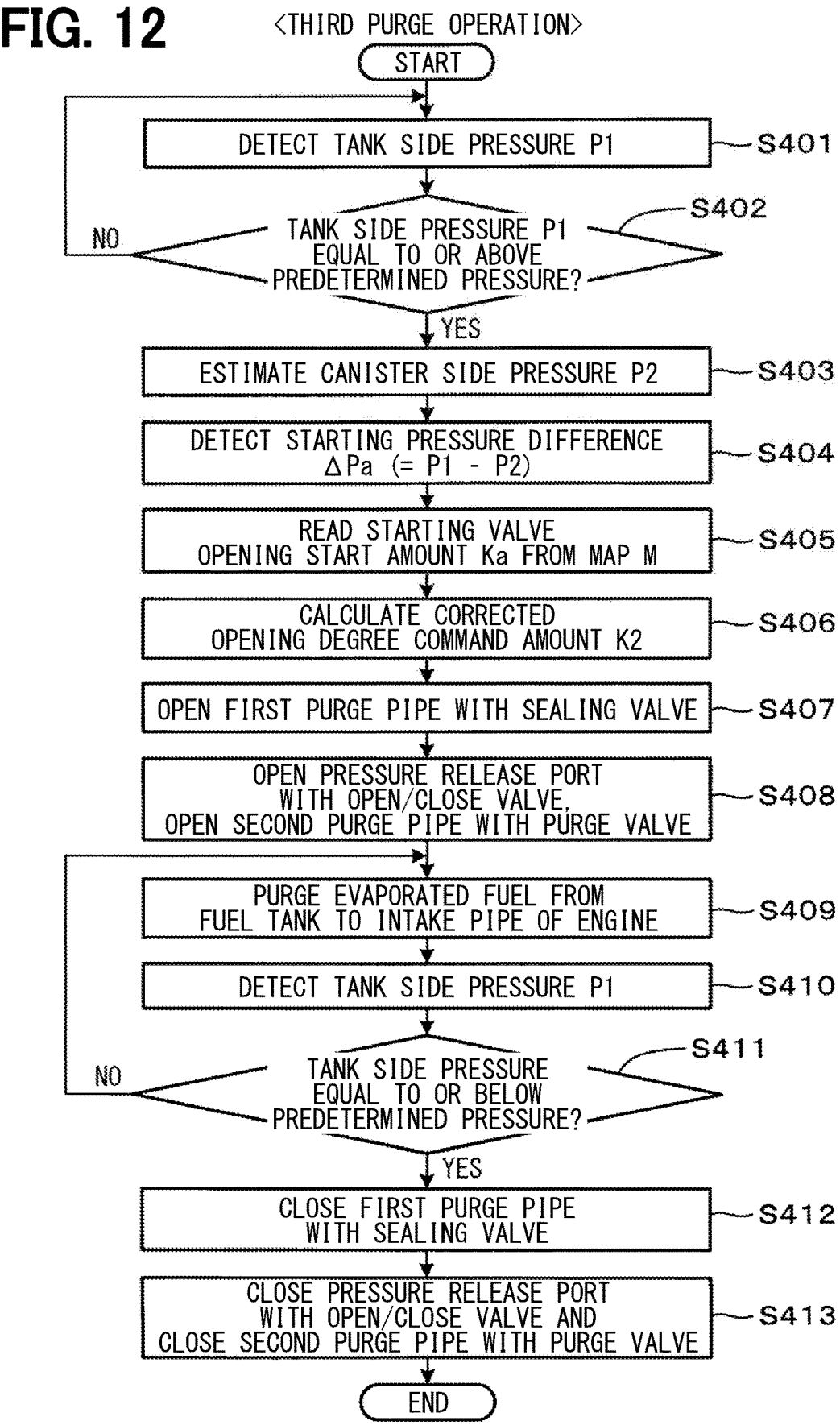
FIG. 12 is a flowchart illustrating a third purge operation according to the first embodiment.
Figure 13:
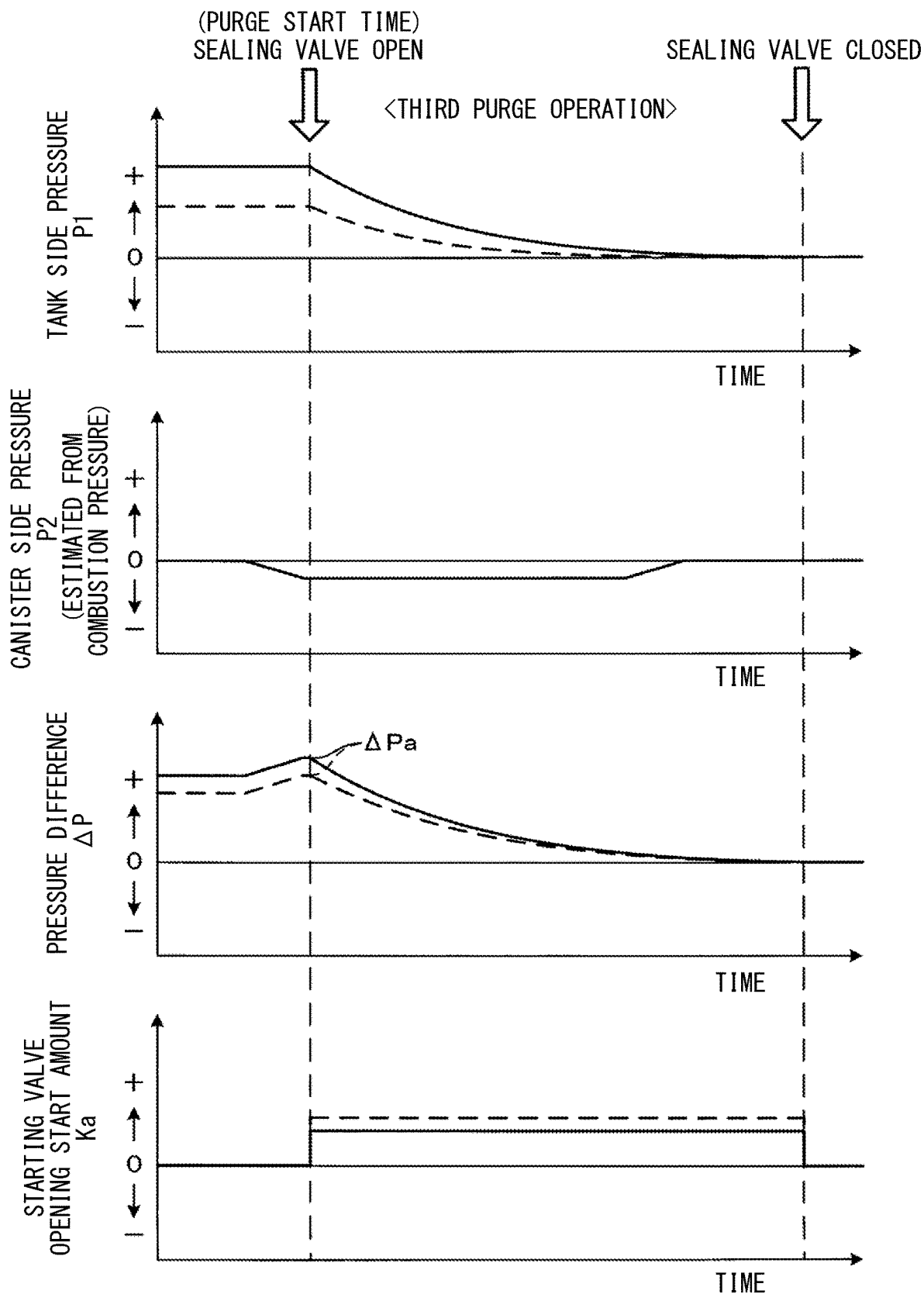
FIG. 13 is a graph showing change over time, during a third purge operation, for tank side pressure, canister side pressure, pressure difference between the tank side pressure and the canister side pressure, and starting valve opening start amount.

The third purge operation 503 is an operation in which the first purge pipe 41 is opened by the sealing valve 3 and at the same time the second purge pipe 42 is opened by the purge valve 43, such that the evaporated fuel F1 in the fuel tank 62 is purged into the intake pipe 611 through the canister 2, as shown in FIGS. 12 and 13. The learning operation 504 is an operation of learning the opening degree of the sealing valve 3 in at least one of the first purge operation 501 and the third purge operation 503, as shown in FIGS. 7 and 8.

Figure 2:
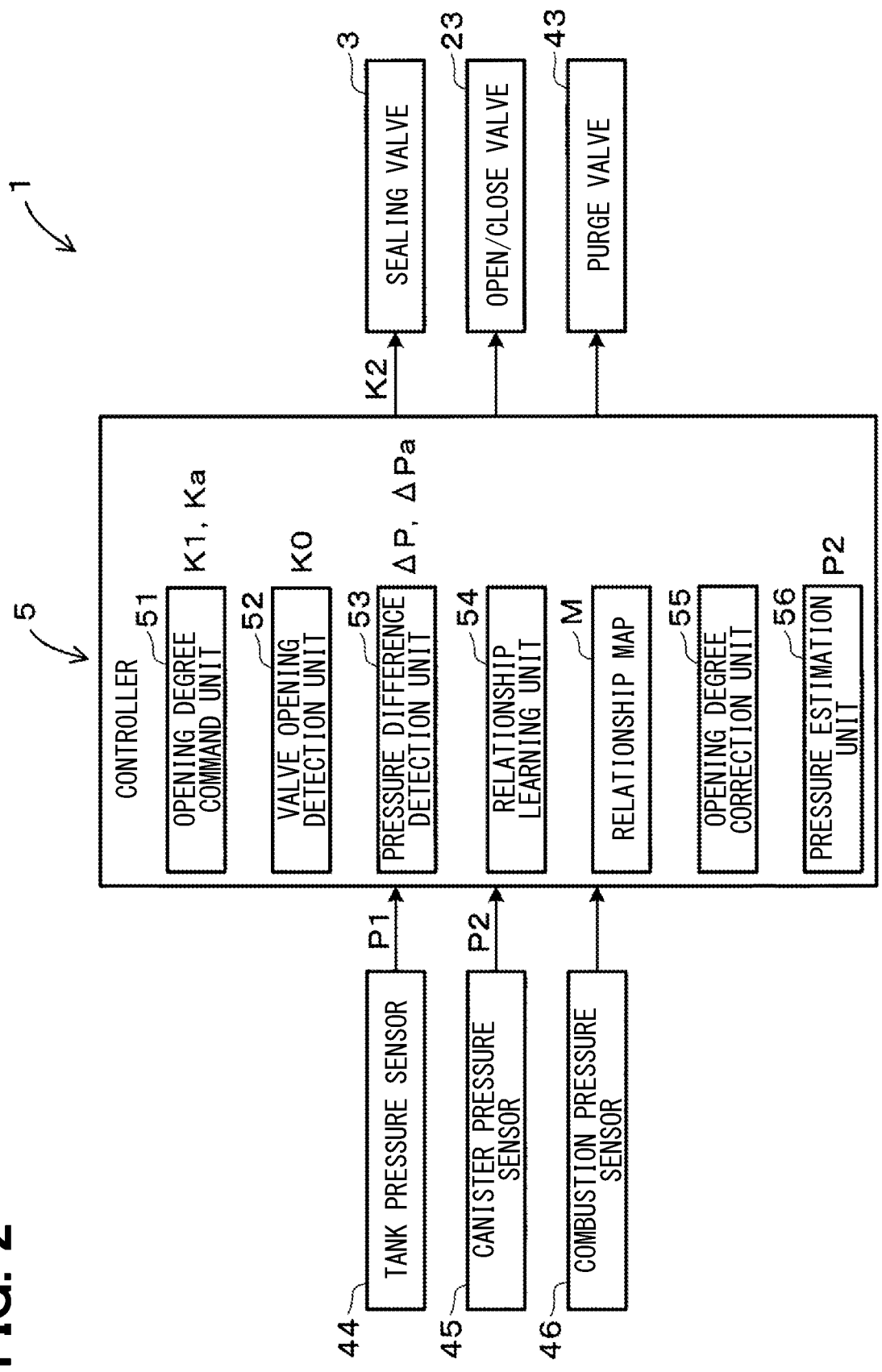
FIG. 2 is an explanatory diagram schematically showing a controller of the evaporated fuel processing device according to the first embodiment.
Figure 5:
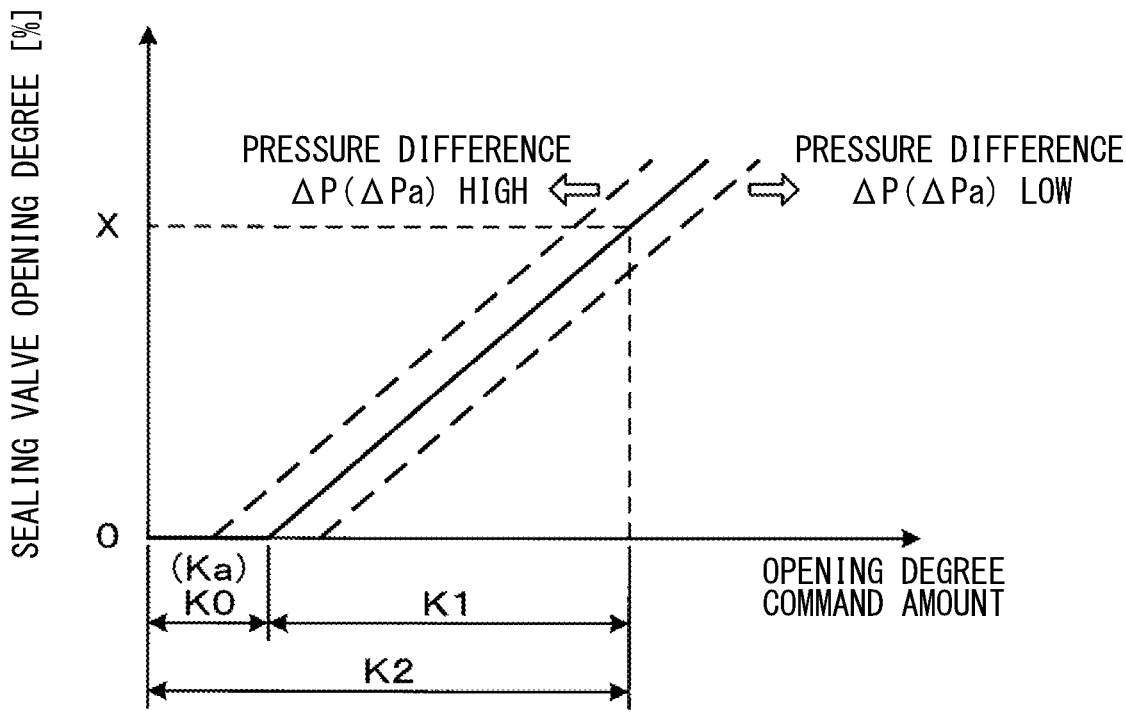
FIG. 5 is a graph showing a relationship between an opening degree command amount from an opening degree command unit and an opening degree of a sealing valve according to the first embodiment.

As shown in FIGS. 2 and 5, the controller 5 includes an opening degree command unit 51, a valve opening detection unit 52, a pressure difference detection unit 53, a relationship learning unit 54, and an opening degree correction unit 55. The opening degree command unit 51 is a control unit that transmits an opening degree command amount K1 to the stepping motor 35. The opening degree command amount K1 determines the opening degree of the sealing valve 3. The valve opening detection unit 52 is a control unit that, when the opening degree command amount K1 is gradually increased from zero, determines the opening degree command amount K1 has reached a valve opening start amount K0 when the tank side pressure P1 begins to decrease. The pressure difference detection unit 53 is a control unit for detecting a pressure difference ΔP which is a difference between the tank side pressure P1 and the canister side pressure P2. In particular, the pressure difference detection unit 53 is configured to detect the pressure difference ΔP when the opening degree command amount K1 reaches the valve opening start amount K0 or when the first purge pipe 41 is opened by the sealing valve 3.

Figure 6:
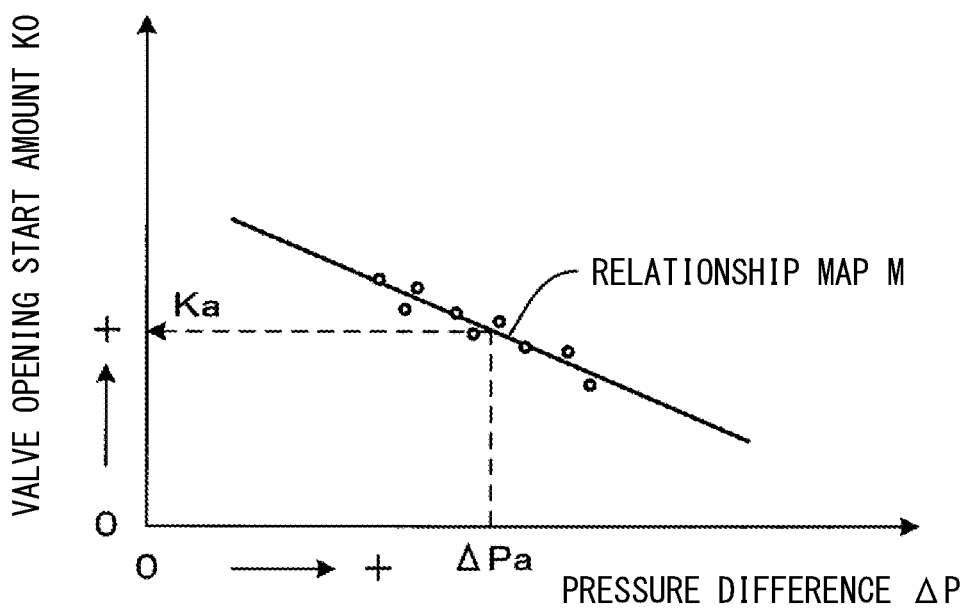
FIG. 6 is a graph showing a relationship map between a valve opening start amount and a pressure difference according to the first embodiment.

As shown in FIGS. 2 and 6, the relationship learning unit 54 is a control unit that, during the learning operation 504, learns the relationship between the valve opening start amount K0 and the pressure difference ΔP. In particular, the relationship learning unit 54 learns this relationship when the valve opening detection unit 52 detects a plurality of different valve opening start amounts K0 and the pressure difference detection unit 53 detects a plurality of different pressure differences. Then, the relationship learning unit 54 creates a relationship map M between the valve opening start amount K0 and the pressure difference ΔP. The opening degree correction unit 55 is a control unit that, during at least one of the first purge operation 501 or the third purge operation 503, detects a starting pressure difference ΔPa using the pressure difference detection unit 53. The starting pressure difference ΔPa is defined as the pressure difference ΔP at the time when the first purge pipe 41 is opened by the sealing valve 3. In addition, the opening degree correction unit 55 checks the starting pressure difference ΔPa against the relationship map M, reads the starting valve opening start amount Ka equal to the valve opening start amount K0 corresponding to the starting pressure difference ΔPa, and corrects the opening degree command amount K1 from the command unit 51 with the starting valve opening start amount Ka.

Hereinafter, the evaporated fuel processing device 1 of the present embodiment will be described in detail. (EVAPORATED FUEL PROCESSING DEVICE 1)

As shown in FIG. 1, in the vehicle 6, the evaporated fuel processing device 1 is used such that the evaporated fuel F1, which is part of the gas phase K in the fuel tank 62, is not released into atmosphere when fuel F is supplied to the fuel tank 62. The evaporated fuel F1 is stored in the canister 2 and then discharged to the intake pipe 611 of the internal combustion engine 61, or is directly discharged to the intake pipe 611 of the internal combustion engine 61 through the canister 2. Then, the fuel component of the evaporated fuel F1 is used for combustion in the internal combustion engine 61.

The flow rate of combustion air A supplied from the intake pipe 611 to the internal combustion engine 61 is adjusted by operating a throttle valve 612 disposed in the intake pipe 611. The internal combustion engine 61 is provided with a fuel injection device 63 that injects fuel F supplied from the fuel tank 62. Further, the internal combustion engine 61 is provided with a combustion pressure sensor 46 that detects a pressure (combustion pressure) in a combustion chamber of the internal combustion engine 61.

(Fuel Tank 62)

As shown in FIG. 1, the fuel tank 62 stores the fuel F used for the combustion operation of the internal combustion engine 61. The fuel tank 62 includes a fuel supply port 621, a purge port 622, and a fuel pump 623. The fuel supply port 621 is used to receive fuel F supplied to the fuel tank 62 from outside. The purge port 622 is connected to the first purge pipe 41. The fuel pump 623 is used when supplying the fuel F to the fuel injection device 63 of the internal combustion engine 61.

A cap that closes the fuel supply port 621 during normal operation is disposed over the fuel supply port 621. The cap is opened when refueling through the fuel supply port 621. In the fuel tank 62, a sensor is provided for sensing gas phase pressure and stopping refueling by the refueling nozzle. The fuel pump 623 supplies liquid phase fuel from the fuel tank 62 to the fuel injection device 63.

(Canister 2)

As shown in FIG. 1, the canister 2 includes a case 21 and an adsorbent 22 such as activated carbon. The adsorbent is disposed in the case 21 and adsorbs the evaporated fuel (i.e., fuel vapor) F1. The case 21 of the canister 2 includes an inlet 211, an outlet 212, and a pressure release port 213. The inlet 211 is connected to the first purge pipe 41 and allows evaporated fuel F1 to enter. The outlet 212 is connected to the second purge pipe 42 and allows fuel components to exit. The pressure release port 213 openable to atmosphere. An open/close valve 23 for opening and closing the pressure release port 213 is provided at the pressure release port 213. When purging (exhausting) evaporated fuel F1 from the gas phase K in the fuel tank 62 to the canister 2, the open/close valve 23 opens the pressure release port 213 to atmosphere. Then, in the canister 2, the fuel components in the evaporated fuel F1 are adsorbed by the adsorbent 22, while the pressure in the canister 2 becomes equal to atmospheric pressure.

The fuel components adsorbed by the adsorbent 22 of the canister 2 pass through the second purge pipe 42 and are discharged to the intake pipe 611 of the internal combustion engine 61. At this time, the pressure release port 213 of the canister 2 is opened to the atmosphere, and the second purge pipe 42 is opened by the purge valve 43. The fuel components adsorbed by the adsorbent 22 are discharged to the intake pipe 611 of the internal combustion engine 61 by an airflow generated from the pressure difference between atmospheric pressure entering the canister 2 through the pressure release port 213 and the negative pressure in the intake pipe 611.

(Sealing Valve 3)

Figure 3:
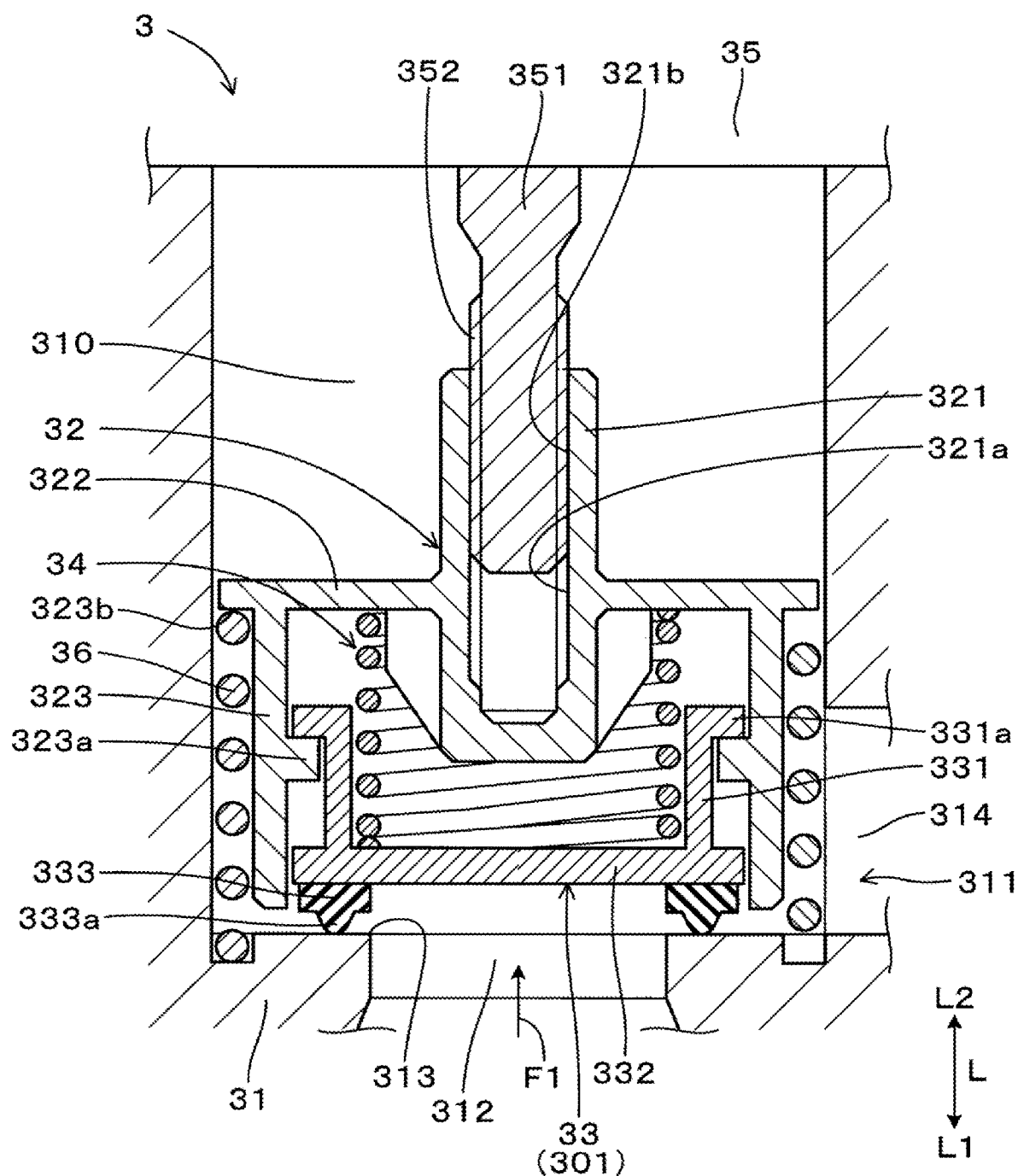
FIG. 3 is an explanatory diagram illustrating a sealing valve in a closed position in the evaporated fuel processing device according to the first embodiment.
Figure 4:
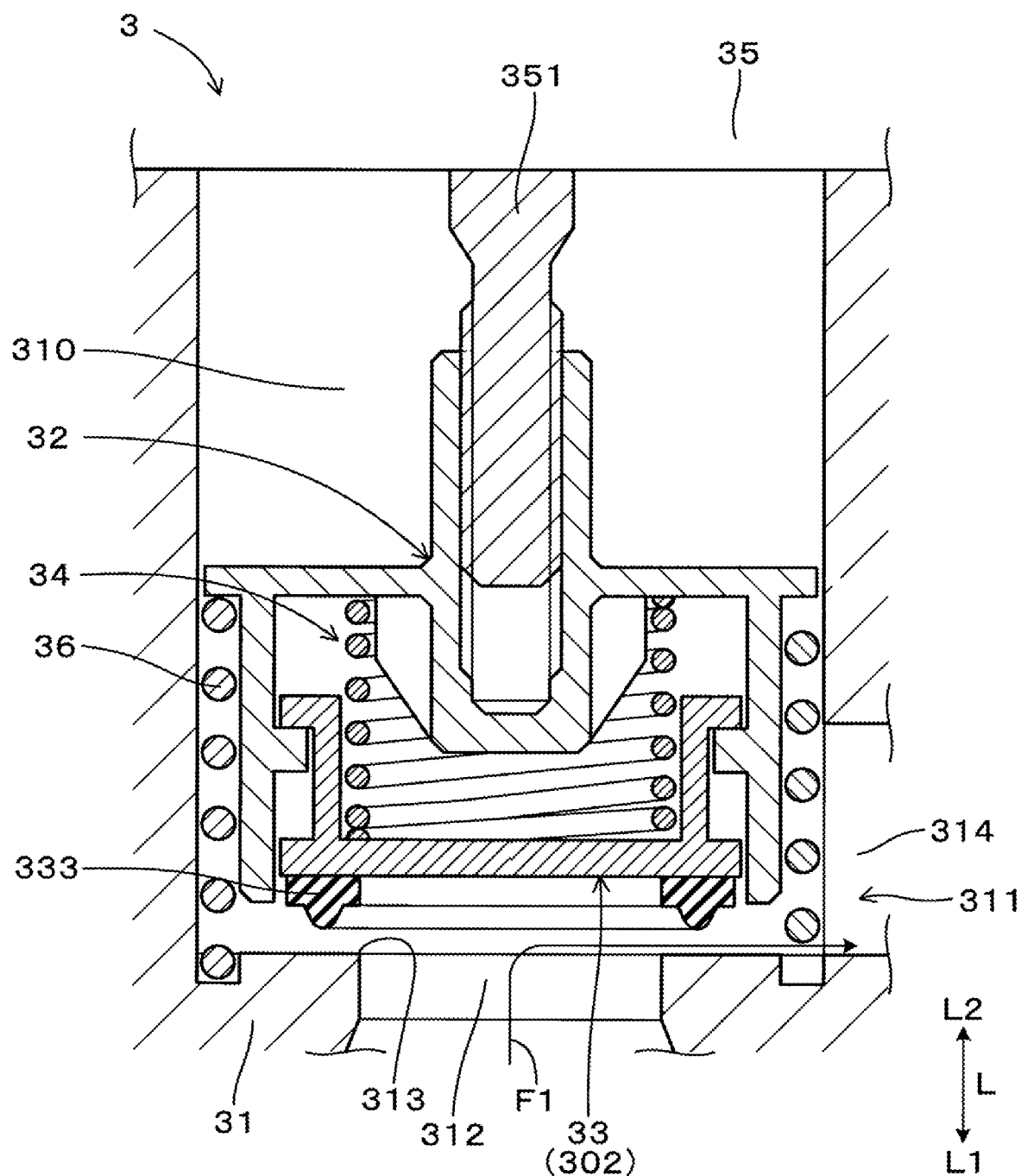
FIG. 4 is an explanatory diagram showing a sealing valve in an open position in the evaporated fuel processing device according to the first embodiment.

As shown in FIGS. 3 and 4, the sealing valve 3 of the present embodiment includes a housing 31, a valve guide 32, a valve 33, a valve side spring 34, a stepping motor 35, and a guide side spring 36. The housing 31 forms a case for the sealing valve 3, and includes a sealing passage 311 connected to the first purge pipe 41. The valve guide 32 is configured to be movable forward and backward with respect to the housing 31 by converting the rotational force of the stepping motor 35 into an actuating force. The valve 33 is slidably engaged with the valve guide 32, and is configured to open and close the sealing passage 311 of the housing 31.

The valve side spring 34 is interposed between the valve guide 32 and the valve 33, and biases the valve 33 in a direction of closing the sealing passage 311. The guide side spring 36 is disposed on the outer periphery of the valve guide 32, and serves to reduce backlash generated between an output shaft 351 of the stepping motor 35 and the valve guide 32.

(Housing 31)

As shown in FIGS. 3 and 4, the housing 31 includes an housing hole 310 for housing the valve guide 32 and the sealing passage 311 which is in communication with the housing hole 310. The housing hole 310 is formed from a proximal side L2 along an axial direction L of the housing 31. The sealing passage 311 includes an inflow portion 312 and an outflow portion 314. The inflow portion 312 is connected to the fuel tank 62. The evaporated fuel F1 flows in through the inflow portion 312. Further, the evaporated fuel F1 flows out through the outflow portion 414 to the canister 2. The inflow portion 312 is formed parallel to the housing hole 310 at a distal side L1 of the housing hole 310, and the outflow portion 314 is formed perpendicular to the housing hole 310.

(Axial Direction L)

The axial direction L is a direction parallel to the direction along which the valve 33 opens and closes the sealing passage 311. In the axial direction L of the sealing valve 3, the side on which the stepping motor 35 is disposed is referred to as the proximal side L2, and the side on which the sealing passage 311 is closed by the valve 33 is referred to as the distal side L1.

(Valve Guide 32)

As shown in FIGS. 3 and 4, the valve guide 32 includes a center shaft portion 321, a guide disc portion 322, a guide cylinder portion 323, and a locking portion 323a. The center shaft portion 321 is fixed to the output shaft 351 of the stepping motor 35. The guide disk portion 322 is formed around the center shaft portion 321. The guide cylinder portion 323 is formed in a cylindrical shape protruding from the peripheral portions of the guide disk portion 322. The locking portion 323a is formed on the inner peripheral surface of the guide cylinder portion 323 to lock the valve 33. A male screw threading 352 is formed on the outer surface of the output shaft 351 of the stepping motor 35. A hollow hole 321a is formed at the center of the center shaft portion 321 of the valve guide 32, and a female screw threading 321b is formed on the inner surface of the hollow hole 321a. The female screw threading 321b is screwed together with the male screw threading 352 of the output shaft 351 of the stepping motor 35. The locking portion 323a is formed as a protruding portion that protrudes inward from the inner peripheral surface of the guide cylinder portion 323. The main body of the stepping motor 35 is fixed to the housing 31.

(Valve 33)

As shown in FIGS. 3 and 4, the valve 33 includes a valve cylinder portion 331, a valve closing plate portion 332, and a sealing member 333. The valve cylinder portion 331 is disposed inside the guide cylinder portion 323 of the valve guide 32. Further, the valve cylinder portion 331 includes a locking protrusion 331a configured to lock with the locking portion 323a of the valve guide 32. The valve closing plate portion 332 closes the end portion of the valve cylinder portion 331. The sealing member 333 is a ring-shaped member disposed on the valve closing plate portion 332. The sealing member 33 is configured to close an opening portion 313 of the sealing passage 311. The valve cylinder portion 331 is formed in a cylindrical shape and guides the outer periphery of the valve side spring 34. The locking protrusion 331a is formed so as to protrude radially outward from an end portion of the valve cylinder portion 331 on the proximal side L2 of the axial direction L. The valve closing plate portion 332 and the locking protrusion 331a are guided in the axial direction L by the inner circumference of the guide cylinder portion 323 of the valve guide 32.

The sealing member 333 is arranged in the housing 31 at the periphery of the opening portion 313 of the inflow portion 312 of the sealing passage 311. A sealing portion 333a is disposed in the housing 31 on the distal side L1 of the sealing member 333 in the axial direction. The sealing portion 333a is configured to elastically deform when coming into contact with the peripheral portion of the opening portion 313 of the inflow portion 312 of the sealing passage 311. The position of the distal side L1 of the entirety of the sealing portion 333a in the axial direction L is within an imaginary plane parallel to the surface of the valve closing plate portion 332 on the proximal side L2 in the axial direction L.

The valve 33 is biased toward the distal side L1 in the axial direction L by the valve side spring 34, and the locking protrusion 331a of the valve cylinder portion 331 of the valve 33 engages with the locking portion 323a of the guide cylinder portion 323 of the valve guide 32. Due to this, the valve 33 is retained within the valve guide 32. As shown in FIGS. 3 and 4, the valve 33 is movable between a closed position 301 and an open position 302. Specifically, the valve 33 is normally in the closed position 301 due to being biased by the valve side spring 34 to close the sealing passage 311. Further, the valve 33 is configured to be moved toward the open position 302 in accordance with a movement amount of the valve guide 32 toward the proximal side L2 in the axial direction L. The open position 302 determines the opening degree of the sealing passage 311. The closed position 301 is also referred to as an initial position (normal position) of the valve 33. In other words, the default state of the valve 33 is to close the sealing passage 311 with the sealing member 333.

As shown in FIG. 3, the opening portion 313 of the inflow portion 312 of the sealing passage 311 is normally closed by the sealing portion 333a of the sealing member 333 of the valve 33. In this state, the valve side spring 34 is in a compressed state and applies a spring force on the valve closing plate portion 332 toward the distal side L1 of the axial direction L. At the same time, the evaporated fuel F1 in the inflow portion 312 exerts a fuel pressure on the valve closing plate portion 332 toward the proximal side L2 of the axial direction L. In the state shown in FIG. 3, the spring force is greater than the fuel pressure. As a result, the valve 33 is maintained at the closed position 301, and the sealing passage 311 is maintained in a closed state.

On the other hand, as shown in FIG. 4, when the valve guide 32 is moved by the stepping motor 35 toward the proximal side L2 in the axial direction L in order to open the opening portion 313 of the inflow portion 312 of the sealing passage 311, the valve 33 and the valve side spring 34 are also moved toward the proximal side L2 in the axial direction L. As a result, the sealing portion 333a of the sealing member 333 of the valve 33 separates from the peripheral edge of the opening portion 313 of the inflow portion 312 of the sealing passage 311 in the housing 31, and the valve 33 moves to the opening position 302, and the sealing passage 311 is opened. In this manner, the amount by which the valve guide 32, the valve 33, and the valve side spring 34 move toward the proximal side L2 in the axial direction L is determined according to the number of drive pulses applied to the stepping motor 35. Thus, the opening amount of the sealing passage 311 is quantitatively determined.

(VALVE Side SPRING 34, GUIDE Side SPRING 36)

As shown in FIGS. 3 and 4, the valve side spring 34 and the guide side spring 36 are compression coil springs (torsion coil springs) in which a round wire as a strand is spirally twisted. The valve side spring 34 applies a predetermined biasing force to the valve 33 to close the sealing passage 311, and is configured to retain the valve 33 at the closing position 301 through this biasing force. The guide side spring 36 is arranged on the outer circumference of the guide cylinder portion 323 of the valve guide 32. The guide side spring 36 is interposed between a step portion 323b formed on the guide cylinder portion 323 and the peripheral edge of the opening portion 313 of the inflow portion 312 of the sealing passage 311 in the housing 31.

Since the valve guide 32 is biased toward the proximal side L2 in the axial direction L by the guide side spring 36, the gap between the male threading 352 of the output shaft 351 of the stepping motor 35 and the female threading 321b of the central hole of the center shaft portion 321 of the valve guide 32 is biased toward one side in the axial direction L. Thus, when the output shaft 351 of the stepping motor 35 rotates, backlash in the axial direction L between the output shaft 351 and the valve guide 32 is reduced.

(Purge Valve 43)

As shown in FIG. 1, the purge valve 43 is configured to open the second purge pipe 42 when purging (discharging) the fuel component adsorbed by the adsorbent 22 of the canister 2 to the intake pipe 611 of the internal combustion engine 61 and when purging (discharging) the evaporated fuel F1 in the gas phase K of the fuel tank 62 to the intake pipe 611 of the internal combustion engine 61. The purge valve 43 of this embodiment has a function of opening and closing the second purge pipe 42 in an on or off manner.

The purge valve 43 may be repeatedly opened and closed using a pulse-shaped command signal, and by controlling the on/off ratio (duty ratio) of the pulse width, the opening degree of the second purge pipe 42 may be quantitatively adjusted. Alternatively, the purge valve 43 may be a control valve that can quantitatively adjust the opening degree at which the second purge pipe 42 is opened.

(Tank Pressure Sensor 44)

As shown in FIG. 1, the tank pressure sensor 44 is a pressure gauge that detects the pressure of the gas phase K in the fuel tank 62. The pressure of the gas phase K in the fuel tank 62 includes the pressure of air in addition to the vapor pressure of the evaporated fuel F1.

(CANISTER Side PRESSURE DETECTORS 45, 56)

As shown in FIGS. 1 and 2, the canister side pressure detectors 45 and 56 include a canister side pressure sensor 45 and a pressure estimator 56 in the controller 5. The canister side pressure sensor 45 is provided in the canister 2 and is configured to, during the first purge operation 501, detect a pressure in the canister 2 as a canister side pressure P2. The canister side pressure sensor detects the pressure in the case 21 of the canister 2. The canister side pressure sensor 45 may be installed in a leak check module 47 described in a fourth embodiment described later. In some cases, the canister side pressure sensor 45 is not used.

When the pressure release port 213 is opened by the open/close valve 23, the pressure in the canister 2 becomes equal to the atmospheric pressure due to atmospheric air flowing into the case 21 from the pressure release port 213. On the other hand, the pressure in the canister 2 may become higher than atmospheric pressure due to the pressure applied by a pressure increasing leak check module 47 described in a fourth embodiment described later. Further, when the evaporated fuel F1 is purged from the fuel tank 62 to the intake pipe 611 of the internal combustion engine 61, the pressure in the canister 2 may become lower than the atmospheric pressure due to the negative pressure in the intake pipe 611. In this case, even if the canister 2 is open to the atmosphere through the pressure release port 213, the adsorbent 22 has a resistance to flow of atmosphere air, and the inside of the first purge pipe 41 and the inside of the second purge pipe 42 may have a negative pressure. Further, the pressure in the canister 2 may become lower than the atmospheric pressure due to the pressure reduced by a pressure-reduction type leak check module 47 described in a fourth embodiment described later.

The pressure estimating unit 56 of the controller 5 is configured to, during the third purge operation 503, estimate the canister side pressure P2 based on the combustion pressure of the internal combustion engine 61 using the combustion pressure sensor 46. The combustion pressure of the internal combustion engine 61 increases during the combustion stroke and becomes higher than the atmospheric pressure, and decreases during the intake stroke and becomes lower than the atmospheric pressure. When the second purge pipe 42 is opened by the purge valve 43, the pressure in the canister 2 becomes lower than the atmospheric pressure via the second purge pipe 42 due to the negative pressure (vacuum pressure) of the intake pipe 611.

(Controller 5)

As shown in FIG. 1, the controller 5 of the evaporated fuel processing device 1 is disposed in the vehicle 6. In the present embodiment, the controller 5 is an electronic control unit that includes at least one processor such as an embedded microprocessor and at least one physical memory device that stores computer readable programs which are executed by the at least one processor to perform the various functions described herein. The controller 5 may also include hardware logic circuits such as ASICs as appropriate. In other words, the various functional units described in this disclosure, such as the opening degree command unit 51, may be implemented as pure software, pure hardware logic circuit, or a combination of software and hardware. For convenience, these functional units are simply described as being part of the controller 5.

The sealing valve 3, the purge valve 43, and the open/close valve 23 are connected to the controller 5 of the vehicle 6 as output devices, and are configured to open and close in response to a command from the controller 5. When a predetermined number of drive pulses are supplied from the controller to the stepping motor 35 in the sealing valve 3, the valve 33 opens the opening portion 313 of the sealing passage 311. The tank pressure sensor 44, the canister side pressure sensor 45, and the combustion pressure sensor 46 are connected to the controller 5 of the vehicle 6 as input devices, and are configured to transmit pressure information to the controller 5.

Note that the controller 5 of the evaporated fuel processing device 1 may be provided separately from the vehicle 6, and may be connected to a separate controller disposed within the vehicle 6 so that data can be transmitted and received between the evaporated fuel processing device 1 and the vehicle 6. When the evaporated fuel F1 is purged from the canister 2 or the fuel tank 62 to the intake pipe 611 of the internal combustion engine 61 by the first purge operation 501 or the third purge operation 503, the controller 5 reduces the amount of fuel supplied from the fuel injection device 63 to the internal combustion engine 61 so as to regulate the air-fuel ratio in the internal combustion engine 61.

The sealing operation by the controller 5 refers to an operation in which the valve 33 of the sealing valve 3 closes the opening portion 313 of the sealing passage 311 and maintains the fuel tank 62 in a sealed state. During the sealing operation, the rotation position of the output shaft 351 of the stepping motor 35 is held to maintain a state in which the valve 33 is at the closing position (initial position) 301. During normal operation of the evaporated fuel processing device 1, the controller 5 executes the sealing operation. In other words, the sealing operation is performed by default.

The first purge operation 501 by the controller 5 is performed when, prior to refueling the fuel tank 62, the evaporated fuel F1 in the fuel tank 62 is purged to the canister 2. By performing the first purge operation 501, the pressure of the gas phase K in the fuel tank 62 is reduced. As a result, it is possible to prevent the evaporated fuel F1 in the gas phase K of the fuel tank 62 from being released to atmosphere when the fuel supply port 621 of the fuel tank 62 is opened.

The second purge operation 502 by the controller 5 is performed when the fuel component adsorbed by the adsorbent 22 of the canister 2 is to be used in the internal combustion engine 61 to burn a mixture of fuel and combustion air. The third purge operation 503 by the controller 5 performed when, after the fuel tank 62 is refueled and the internal combustion engine 61 initiates a combustion operation, the evaporated fuel F1 in the fuel tank 62 is supplied to the intake pipe 611 of the internal combustion engine 61. By performing the third purge operation 503, the pressure of the gas phase K in the fuel tank 62 can be reduced during the combustion operation of the internal combustion engine 61.

The learning operation 504 by the controller 5 is performed while the sealing operation by the controller 5 is being performed, and includes gradually increasing the opening degree command amount K1, which is sent from the opening degree command unit 51 to the stepping motor 35, from zero. Further, the learning operation 504 is performed during a process in which the pressure in the fuel tank 62 changes while the sealing operation is being performed. This is because the change in the pressure in the fuel tank 62 greatly affects the pressure difference ΔP between the tank side pressure P1 and the canister side pressure P2. By performing the learning operation 504, a relationship map M between the valve opening start amount K0 and the pressure difference ΔP can be obtained for a plurality of different pressure differences ΔP between the tank side pressure P1 and the canister side pressure P2.

(Opening Degree Command Unit 51)

As shown in FIG. 2, the opening degree command unit 51 of the controller 5 transmits an opening degree command amount K1 to the stepping motor 35 of the sealing valve 3 during the first purge operation 501, the third purge operation 503, and the learning operation 504. The opening degree command amount K1 is a predetermined number of drive pulses for driving the stepping motor 35. The opening degree command amount K1 from the opening degree command unit 51 is determined by the number of drive pulses for driving the stepping motor 35. The output shaft 351 of the stepping motor 35 rotates by a predetermined angle in response to each drive pulse transmitted to the stepping motor 35. Accordingly, the valve guide 32, the valve 33, and the valve side spring 34 move by a predetermined amount in the axial direction L per drive pulse as well.

The opening degree of the sealing valve 3 is determined according to the number of pulses transmitted to the stepping motor 35. However, a dead zone exists in the sealing valve 3. The dead zone means that the valve 33 is actually closed even when the stepping motor 35 is energized in a step-like manner while the valve 33 of the sealing valve 3 is in the closing position 301. The dead zone is defined as the number of pulses that do not move the valve 33 from the position 301, in other words, the number of pulses during which the sealing member 333 of the valve 33 does not separate from the sealing passage 311 and the tank side pressure P1 does not begin to decrease. In addition, the number of pulses equal to the dead zone is represented as a valve opening start amount K0 of the sealing valve 3.

The valve opening start amount K0 compensates for the dead zone of the sealing valve 3. When the valve opening start amount K0 is added to the opening degree command amount K1 by the opening degree command unit 51, the opening degree command amount K1 can be used to proportionally change the opening degree of the sealing valve 3 from zero. Further, the valve opening start amount K0 can be regarded as an opening degree correction amount for correcting the opening degree command amount K1 with the opening degree command unit 51. The valve opening start amount K0, which is the opening degree correction amount, changes according to the pressure difference ΔP between the tank side pressure P1 and the canister side pressure P2.

If the flow rate of the evaporated fuel F1 to be purged from the fuel tank 62 to the canister 2 is too small, it takes time to purge the evaporated fuel F1. Conversely, if this flow rate is too large, there is a concern that the evaporated fuel F1 is not sufficiently adsorbed by the adsorbent 22 and escapes through the pressure release port 213 of the canister 2. Therefore, the opening degree of the sealing valve 3 is appropriately set, and the flow rate of the evaporated fuel F1 passing through the sealing valve 3 is appropriately set. The gas flowing from the fuel tank 62 to the canister 2 or the intake pipe 611 of the internal combustion engine 61 may include air and the like in addition to the evaporated fuel F1. In the present embodiment, this gas may be collectively referred to as evaporated fuel F1.

Specifically, the flow rate of the evaporated fuel F1 passing through the sealing valve 3 is proportional to the product of the opening degree of the sealing valve 3 and the pressure difference ΔP between the tank side pressure P1 and the canister side pressure P2. Therefore, in the evaporated fuel processing device 1, the opening degree of the sealing valve 3 is decreased by the opening degree correction unit 55 as the pressure difference ΔP increases in order to set the flow rate of the evaporated fuel F1 passing through the sealing valve 3 to a target flow rate.

During the first purge operation 501 and the third purge operation 503, the opening degree command unit 51 determines the opening degree command amount K1 such that the evaporated fuel F1 flows through the sealing valve 3 at the target flow rate. At this time, the opening degree command amount K1 is corrected by the opening degree correction unit 55 based on the valve opening start amount K0, so that the flow rate of the evaporated fuel F1 flowing through the sealing valve 3 is corrected.

(Valve Opening Detection Unit 52)

As shown in FIGS. 2 and 5, during the learning operation 504, when the valve 33 is in the closed position (initial position) 301, the valve opening detection unit 52 of the controller 5 sends monitors two values: the opening degree command amount K1 transmitted from the opening degree command unit 51 to the stepping motor 35, and the tank side pressure P1 received from the tank pressure sensor 44. Then, the valve opening detection unit 52 detects the valve opening start amount K0 as the value of the opening degree command amount K1 when the tank side pressure P1 begins to decrease. The valve opening start amount K0 is represented by an integrated value of the number of drive pulses transmitted to the stepping motor 35. The point in time when the tank side pressure P1 begins to decrease can be defined as the point in time when the tank side pressure P1 has decreased by a predetermined amount.

(Pressure Difference Detection Unit 53)

As shown in the drawings, during the first purge operation 501, the third purge operation 503, and the learning operation 504, the pressure difference detection unit 53 of the controller 5 receives the tank side pressure P1 from the tank pressure sensor 44 and receives the canister side pressure P2 from the canister side pressure sensor 45. Then, the pressure difference detection unit 53 obtains the pressure difference ΔP by subtracting the canister side pressure P2 from the tank side pressure P1.

As shown in FIG. 6, during the learning operation 504, in order to create a relationship map M between the valve opening start amount K0 and the pressure difference ΔP, the pressure difference detection unit 53 detects the pressure difference ΔP at the moment when the opening degree command amount K1 reaches the valve opening start amount K0. Further, during the first purge operation 501 and the third purge operation 503, in order for the opening degree command unit 51 to correct the opening degree command amount K1 in accordance with the magnitude of the pressure difference ΔP, the pressure difference detection unit 53 detects the pressure difference ΔP at the moment when the first purge pipe 41 is opened by the sealing valve 3.

(Relationship Learning Unit 54)

As shown in FIGS. 2 and 5, the relationship learning unit 54 of the controller 5 is provided so that, after the vehicle 6 and the evaporated fuel treatment device 1 are started, the opening degree command unit 51 can correct the opening degree command amount K1 based on the pressure difference ΔP. The relationship learning unit 54 is configured to, when the valve 33 is in the closed position 301, read the valve opening start amount K0 detected by the valve opening detection unit 52 while the opening degree command unit 51 gradually increases the opening degree command amount K1 from zero. The relationship learning unit 54 reads this for a plurality of different values of the pressure difference ΔP between the tank side pressure P1 and the canister side pressure P2. As a result, as shown in FIG. 6, the relationship between the valve opening start amount K0 and the pressure difference ΔP can be learned, and a relationship map M between the valve opening start amount K0 and the pressure difference ΔP is created.

(Relationship Map M)

As shown in FIG. 6, the pressure difference ΔP between the tank side pressure P1 and the canister side pressure P2 acts on the valve 33 from the inflow portion 312 and the outflow portion 314 in the sealing passage 311. The tank side pressure P1 acting on the inflow portion 312 of the sealing passage 311 is higher than the canister side pressure P2 acting on the outflow portion 314 of the sealing passage 311. A net pressure acts on the valve 33 that biases the valve 33 toward the proximal side L2 of the axial direction L. Then, as the pressure difference ΔP increases, the net pressure, which biases the valve 33 toward the proximal side L2 of the axial direction L, also increases. For this reason, the valve opening start amount K0 of the open/close valve 23 detected by the valve opening detection unit 52 is smaller as the pressure difference ΔP increases.

(Opening Degree Correction Unit 55)

As shown in FIGS. 2 and 5, the opening degree correction unit 55 of the controller 5 corrects the opening degree command amount K1 from the opening degree command unit 51 by taking the valve opening start amount K0 into consideration. As a result, even if the opening degree of the sealing valve 3 is not directly measured, the opening degree correction unit 55 is able to correct the error factor caused by the dead zone of the sealing valve 3 such that the opening degree of the sealing valve 3 matches a target opening degree. This ensures that the flow rate of the evaporated fuel F1 passing through the sealing valve 3 is controlled to an appropriate flow rate.

As shown in FIG. 6, the opening degree correction unit 55 uses the relationship map M between the valve opening start amount K0 and the pressure difference ΔP when performing either the first purge operation 501 or the third purge operation 503 and corrects the opening degree command amount K1 from the opening degree command unit 51. The opening degree correction unit 55 is configured to, when performing the first purge operation 501 and the third purge operation 503, detect the starting pressure difference ΔPa using the pressure difference detection unit 53. The starting pressure difference ΔPa is defined as the pressure difference ΔP between the tank side pressure P1 and the canister side pressure P2 at the point in time when the first purge pipe 41 is opened by the sealing valve 3.

Next, the opening degree correction unit 55 checks the starting pressure difference ΔPa against the relationship map M, and reads the valve opening start amount K0 corresponding to that starting pressure difference ΔPa as the starting valve opening start amount Ka. The comparison with the relationship map M is performed in order to correct the opening degree command amount K1 in consideration of the fact that the valve opening start amount K0 varies depending on the magnitude of the pressure difference ΔP. Next, when the opening degree command unit 51 transmits the opening degree command amount K1 to the stepping motor 35 of the sealing valve 3, the opening degree command unit 51 adds the starting valve opening start amount Ka to the opening degree command amount K1 in order to correct the opening degree command amount K1. In other words, the opening degree correction unit 55 changes the number of pulses indicated by the opening degree command amount K1 transmitted from the opening degree command unit 51 to the stepping motor 35 to a number of pulses obtained by adding the number of pulses corresponding to the opening degree command amount K1 to the number of pulses corresponding to the starting valve opening start amount Ka.

As a result, a corrected opening degree command amount K2 is obtained by the opening degree correction unit 55 by adding the opening degree command amount K1, which is based on a target opening degree for the opening degree of the sealing valve 3, to the starting valve opening start amount Ka. Then, during the first purge operation 501 and the third purge operation 503, when the first purge pipe 41 is opened by the sealing valve 3, the opening degree command unit 51 sends the corrected opening degree command amount K2 to the stepping motor 35 of the sealing valve 3, and the opening degree of the sealing valve 3 is set.

(Control of Evaporated Fuel Processing Device 1)

As shown in FIG. 1, in the vehicle 6, when the controller 5 performs the sealing operation such that the opening degree of the sealing valve 3 is zero and the valve 33 closes the sealing passage 311 of the housing 31, the first purge pipe 41 that connects the fuel tank 62 to the canister 2 is closed. In this state, the gas pressure in the gas phase K in the fuel tank 62 due to evaporated fuel F1, air, and the like is constant. Hereinafter, the learning operation 504 and the first to third purge operations 501, 502, and 503 will be described with reference to flowcharts.

(Learning Operation 504)

As shown in the flowcharts of FIGS. 7 and 8, when the opening of the sealing valve 3 is zero, the controller 5 performs the learning operation 504. First, as shown in FIG. 7, the tank side pressure P1 is detected by the tank pressure sensor 44, and the canister side pressure P2 is detected by the canister side pressure sensor 45 (step S101). The pressure difference ΔP between the tank side pressure P1 and the canister side pressure P2 is detected by the pressure difference detection unit 53 of the controller 5 (step S102). Next, the relationship learning unit 54 of the controller 5 determines whether the detected pressure difference ΔP is suitable for creating a relationship map M (step S103). This determination is performed to obtain the relationships between a plurality of different pressure differences ΔP and corresponding valve opening start amounts K0 for the relationship map M.

If the detected pressure difference ΔP is suitable for creating the relationship map M, a valve opening start amount routine is executed (step S104). As shown in FIG. 8, during the valve opening start amount routine, the opening degree command unit 51 of the controller 5 increases the opening degree command amount K1 by a predetermined amount (step S111). At this time, the valve opening detection unit 52 of the controller 5 detects the tank side pressure P1 from the tank pressure sensor 44 (Step S112), and detects whether or not the tank side pressure P1 has started to decrease (Step S113). When the valve opening detection unit 52 detects the start of the decrease in the tank side pressure P1, the valve opening detection unit 52 reads the opening degree command amount K1 at this time as the valve opening start amount K0 (step S114).

Further, when the start of the decrease in the tank side pressure P1 is detected, the opening degree command amount K1 is equal to the valve opening start amount K0 at this time, and the canister side pressure P2 at the time of this detection is detected by the canister side pressure sensor 45. (Step S115). Then, the pressure difference detection unit 53 detects the pressure difference ΔP between the detected tank side pressure P1 and the detected canister side pressure P2 (Step S116). In this manner, the relationship between the valve opening start amount K0 and the pressure difference ΔP at the time of detection of the start of the decrease in the tank side pressure P1 is obtained as a part of the relationship map M (step S117).

Next, returning to FIG. 7, the detection of the tank side pressure P1 by the tank pressure sensor 44 is continued, and the detection of the canister side pressure P2 by the canister side pressure sensor 45 is continued (step S101). Then, the pressure difference ΔP between the tank side pressure P1 and the canister side pressure P2 is newly detected by the pressure difference detection unit 53 (step S102). Next, the relationship learning unit 54 determines whether the newly detected pressure difference ΔP is suitable for creating a relationship map M (step S103). In this manner, when a plurality of different pressure differences ΔP are detected (Step S103), the valve opening start amount routine is repeatedly performed (Steps S104, S111 to S117).

As described above, until the learning operation 504 is completed (step S105), the relationship between the valve opening start amount K0 and the pressure difference ΔP is obtained (step S117) and the relationship map M between the valve opening start amount K0 and the pressure difference ΔP is created for an appropriate range of pressure differences ΔP between the tank side pressure P1 and the canister side pressure P2.

(First Purge Operation 501)

In the present embodiment, the first purge operation begins when an occupant of the vehicle 6 presses a refueling switch provided in the vehicle compartment prior to refueling the fuel tank 62 with the fuel F. The operation of the refueling switch is interpreted as the start of purging and the first purge operation 501 is performed by the controller 5. At this time, the opening degree correction unit 55 uses the relationship map M to correct the opening degree command amount K1 from the opening degree command unit 51.

Specifically, as shown in the flowchart of FIG. 9, whether or not to perform the first purge operation 501 is determined based on the presence or absence of the input of the refueling switch (step S201). When the refueling switch is pressed, the purge start time is recognized, the tank side pressure P1 is detected by the tank pressure sensor 44, and the canister side pressure P2 is detected by the canister side pressure sensor 45 (step S202). Then, the pressure difference detection unit 53 detects a starting pressure difference ΔPa between the tank side pressure P1 detected at the purge start time and the canister side pressure P2 detected at the purge start time (Step S203).

Next, the starting pressure difference ΔPa is checked against the relationship map M as shown in FIG. 6, and the starting valve opening start amount Ka, which is the valve opening start amount K0 corresponding to the starting pressure difference ΔPa, is read from the relationship map M (step S204). Then, as shown in FIG. 5, the opening degree command amount K1 from the opening degree command unit 51 is used to calculate the corrected opening degree command amount K2 (step S205). Specifically, the corrected opening degree command amount K2 is calculated by adding the starting valve opening start amount Ka to the opening degree command amount K1 corresponding to the target opening degree. The target opening degree is determined according to a target flow rate for the evaporated fuel F1 to be purged from the fuel tank 62 to the canister 2.

Next, the corrected opening degree command amount K2 is transmitted from the opening degree command unit 51 to the stepping motor 35 of the sealing valve 3, and the first purge pipe 41 is opened by the sealing valve 3 (i.e., the valve 33 moves to the open position 302 to open the sealing passage 311) (step S206). Further, in response to a command received from the controller 5, the pressure release port 213 is opened by the open/close valve 23 of the canister 2 (step S207). As a result, the evaporated fuel F1 flowing through the sealing valve 3 is controlled to flow at the target flow rate, and the evaporated fuel F1 is purged from the gas phase K in the fuel tank 62 to the canister 2 via the first purge pipe 41 (step S208). At this time, the gas in the fuel tank 62 flows to the canister 2 due to the difference between the pressure due to the evaporated fuel F1 and the like in the fuel tank 62 and the pressure in the canister 2. As a result, the fuel component of the evaporated fuel F1 contained in the gas is adsorbed by the adsorbent 22 in the canister 2.

Thereafter, the tank side pressure P1 is detected using the tank pressure sensor 44 (step S209), and it is determined whether or not the tank side pressure P1 has dropped below a predetermined pressure (step S210). When the tank side pressure P1 drops to or below the predetermined pressure, the first purge pipe 41 is closed by the sealing valve 3 (i.e., the valve 33 returns to the closed position 301 to close the sealing passage 311) (step S211). In addition, the pressure release port 213 of the canister 2 is closed by the open/close valve 23 (step S212). With this, the first purge operation 501 is completed, and the occupant of the vehicle 6 can open the fuel supply port 621 to supply fuel into the fuel tank 62 from the fuel supply port 621.

FIG. 10 shows change over time in the tank side pressure P1, the canister side pressure P2, the pressure difference ΔP, and the starting valve opening start amount Ka when performing the first purge operation. After the sealing valve 3 is opened, the tank side pressure P1 and the pressure difference ΔP gradually decrease. When the tank side pressure P1 falls below a predetermined pressure, the sealing valve 3 is closed. Since the pressure release port 213 is opened, the canister side pressure P2 is zero (atmospheric pressure). The dashed lines in FIG. 10 show a case when the tank side pressure P1, the canister side pressure P2, and the pressure difference ΔP have different values as the solid lines. Further, the larger the pressure difference ΔP, the smaller the starting valve opening start amount Ka is calculated to be.

In addition, when a vehicle occupant or the like supplies fuel F to the fuel tank, the sealing valve 3 may open the first purge pipe 41 and the open/close valve 23 may open the pressure release port 213 of the canister 2.

(Second Purge Operation 502)

Figure 11:
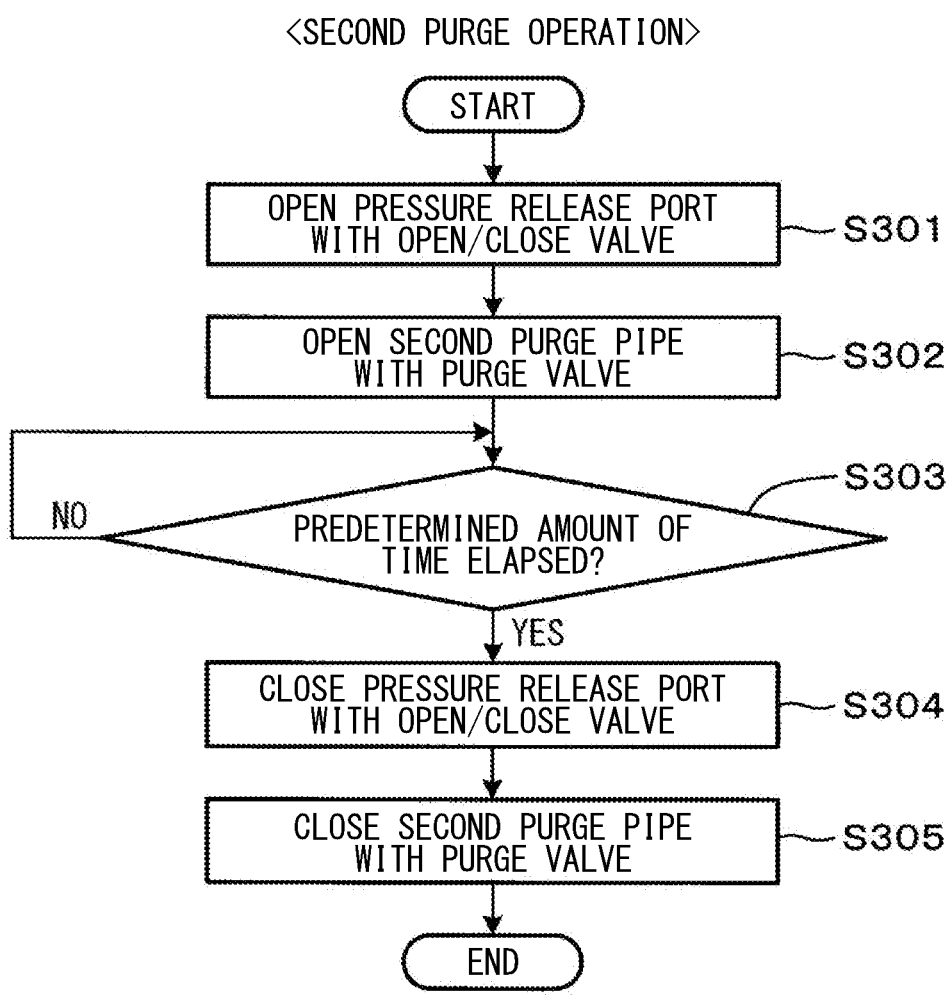
FIG. 11 is a flowchart illustrating a second purge operation according to the first embodiment.

As shown in the flow chart of FIG. 11, the second purge operation 502 is a process in which, while the internal combustion engine 61 is performing combustion operations, the fuel component adsorbed by the adsorbent 22 of the canister 2 is purged to the intake pipe 611 of the internal combustion engine 61. The timing at which the second purge operation 502 is performed is appropriately determined by the controller 5.

When the fuel component adsorbed by the adsorbent 22 is purged from the canister 2 to the intake pipe 611 of the internal combustion engine 61, the pressure release port 213 of the canister 2 is opened by the open/close valve 23 (step S301), and the second purge pipe 42 is opened by the purge valve 43 (step S302). At this time, the canister 2 is connected to the intake pipe 611 of the internal combustion engine 61 via the second purge pipe 42. The fuel component in the adsorbent 22 flows to the intake pipe 611 due to the difference between the pressure in the canister 2 (atmospheric pressure) and the pressure in the intake pipe 611 (negative pressure) of the internal combustion engine 61. The fuel component released from the adsorbent 22 is used for the combustion operation of the internal combustion engine 61 together with the fuel F injected into the internal combustion engine 61.

Next, it is determined whether a predetermined time has elapsed since the open/close valve 23 and the purge valve 43 were opened (step S303). After the predetermined amount of time has elapsed, the pressure release port 213 of the canister 2 is closed by the open/close valve 23 (step S304), and the second purge pipe 42 is closed by the purge valve 43 (step S305). With this, the second purge operation 502 is completed, and the fuel component adsorbed by the adsorbent 22 of the canister 2 is used for the combustion operation of the internal combustion engine 61.

(Third Purge Operation 503)

As shown in the flowchart of FIG. 12, while the internal combustion engine 61 is performing combustion operation, the fuel tank 62 is normally closed by the sealing valve 3. In this state, the tank pressure sensor 44 of the fuel tank 62 continuously monitors the tank side pressure P1 (step S401). In addition, it is determined whether or not the tank side pressure P1 has reached or exceeded a predetermined pressure (step S402). When the tank side pressure P1 reaches or exceeds the predetermined pressure, it signals the purge start time, and the third purge operation 503 is executed by the controller 5.

Specifically, the combustion pressure in the internal combustion engine is detected by the combustion pressure sensor 46, and the canister side pressure P2 is estimated by the pressure estimation unit 56 based on the combustion pressure (step S403). Then, the pressure difference detection unit 53 detects the starting pressure difference ΔPa between the tank side pressure P1 detected at the purge start time and the canister side pressure P2 estimated at the purge start time (Step S404).

Next, the starting pressure difference ΔPa is checked against the relationship map M as shown in FIG. 6, and the starting valve opening start amount Ka, which is the valve opening start amount K0 corresponding to the starting pressure difference ΔPa, is read from the relationship map M (step S405). Then, as shown in FIG. 5, the opening degree command amount K1 from the opening degree command unit 51 is used to calculate the corrected opening degree command amount K2 (step S406). Specifically, the corrected opening degree command amount K2 is calculated by adding the starting valve opening start amount Ka to the opening degree command amount K1 corresponding to the target opening degree. The target opening degree is determined according to a target flow rate for the evaporated fuel F1 to be purged from the fuel tank 62 to the canister 2.

Next, the corrected opening degree command amount K2 is transmitted from the opening degree command unit 51 to the stepping motor 35 of the sealing valve 3, and the first purge pipe 41 is opened by the sealing valve 3 (i.e., the valve 33 moves to the open position 302 to open the sealing passage 311) (step S407). Further, in response to a command received from the controller 5, the pressure release port 213 is opened by the open/close valve 23 of the canister 2, and at the same time the second purge pipe 42 is opened by the purge valve 43 (step S408). Note that the first purge pipe 41 may be opened by the sealing valve 3 after the second purge pipe 42 is opened by the purge valve 43. Further, in an alternative embodiment, the pressure release port 213 can be kept closed when the third purge operation 503 is performed.

In this way, the evaporated fuel F1 flowing through the sealing valve 3 and the purge valve 43 is controlled to flow at the target flow rate. The evaporated fuel F1 from the gas phase K in the fuel tank 62 is purged into the intake pipe 611 of the internal combustion engine 61 via the first purge pipe 41, the canister 2, and the second purge pipe 42 (step S409). At this time, the gas in the fuel tank 62 flows to the intake pipe 611 of the internal combustion engine 61 due to the difference between the pressure due to the evaporated fuel F1 and the like in the fuel tank 62 and the pressure from the intake pipe 611 acting on the canister 2.

Thereafter, the tank side pressure P1 is detected using the tank pressure sensor 44 (step S410), and it is determined whether or not the tank side pressure P1 has dropped below a predetermined pressure (step S411). When the tank side pressure P1 drops to or below the predetermined pressure, the first purge pipe 41 is closed by the sealing valve 3 (i.e., the valve 33 returns to the closed position 301 to close the sealing passage 311) (step S412). Further, the pressure release port 213 of the canister 2 is closed by the open/close valve 23, and the second purge pipe 42 is closed by the purge valve 43 (step S413). With this, the third purge operation 503 is completed, and the evaporated fuel F1 generated in the fuel tank 62 is used for the combustion operation of the internal combustion engine 61.

FIG. 13 shows change over time in the tank side pressure P1, the canister side pressure P2 estimated from combustion pressure, the pressure difference ΔP, and the starting valve opening start amount Ka when performing the third purge operation 503. After the sealing valve 3 is opened, the tank side pressure P1 and the pressure difference ΔP gradually decrease. When the tank side pressure P1 falls below a predetermined pressure, the sealing valve 3 is closed. Since the pressure release port 213 is opened, the canister side pressure P2 is zero (atmospheric pressure). The dashed lines in FIG. 13 show a case when the tank side pressure P1, the canister side pressure P2 estimated from combustion pressure, and the pressure difference ΔP have different values as the solid lines. Further, the larger the pressure difference ΔP, the smaller the starting valve opening start amount Ka is calculated to be.

Further, when the combustion operation of the internal combustion engine 61 is performed, the first purge pipe 41 can be continuously opened by the sealing valve 3 and the second purge pipe 42 can be continuously opened by the purge valve 43.

(Relationship Map M Update Etc.)

In the present embodiment, flowcharts (FIGS. 7, 8, 9, 11, and 12) in which the learning operation 504, the first purge operation 501, the second purge operation 502, and the third purge operation 503 are separately performed are described. The learning operation 504 is not limited to being performed only prior to the first to third purge operations 501, 502, and 503. For example, the learning operation 504 may be continuously performed, including after the first to third purge operations 501, 502, and 503 are performed. The learning operation 504 can be performed at an appropriate timing during the sealing operation of the controller 5 in which the fuel tank 62 is sealed by the sealing valve 3. In addition, the learning operation 504 may be performed between the first purge operation 501 and the second purge operation 502, between the second purge operation 502 and the third purge operation 503, and between the third purge operation 503 and the first purge operation 501.

Further, the first to third purge operations 501, 502, and 503 can be performed before the relationship map M is created by the learning operation 504. In this case, the opening degree correction unit 55 may temporarily use a predefined relationship map initially set in the controller 5. Then, after the relationship map M is generated by a subsequent learning operation 504, the created relationship map M can be used. The relationship map M can be appropriately updated each time the learning operation 504 is performed.

(Operation Effect)

In the evaporated fuel treatment device 1 of the present embodiment, when the stepping motor 35 is operated and the sealing valve 3 actually opens the first purge pipe 41, in order to correct the valve opening start amount K0, the pressure difference ΔP between the tank side pressure P1 and the canister side pressure P2 is used. More specifically, the relationship learning unit 54 of the controller 5 learns the relationship between a plurality of valve opening start amounts K0 and a plurality of pressure differences ΔP, and maps the relationship between the valve opening start amount K0 and the pressure difference ΔP as the relationship map M. By using the relationship map M, the valve opening start amount K0 of the sealing valve 3, which changes according to the pressure difference ΔP between the tank side pressure P1 and the canister side pressure P2 when the first purge pipe 41 is opened by the sealing valve 3, can be obtained. The relationship map M is defined such that the larger the pressure difference ΔP, the smaller the valve opening start amount K0.

Further, the opening degree correction unit 55 of the controller 5 detects the starting pressure difference ΔPa when the first purge pipe 41 is opened by the sealing valve 3 during at least one of the first purge operation 501, in which the evaporated fuel F1 is purged from the fuel tank 62 to the canister 2, and the third purge operation 503, in which the evaporated fuel F1 is purged from the fuel tank 62 to the intake pipe 611 of the internal combustion engine 61. Then, the opening degree correction unit 55 checks the starting pressure difference ΔPa against the relationship map M, reads the starting valve opening start amount Ka corresponding to the starting pressure difference ΔPa, and obtains the corrected opening degree command amount K2 by adding the opening degree command amount K1 from the command unit 51 to the starting valve opening start amount Ka. Then, the corrected opening degree command amount K2 is transmitted from the opening degree command unit 51 to the stepping motor 35 of the sealing valve 3 so that the opening degree of the sealing valve 3 matches a target opening degree corresponding to the target flow rate.

As a result, at the purge start time when the first purge pipe 41 is opened by the sealing valve 3, the corrected opening degree command amount K2 is transmitted from the opening degree command unit 51 of the controller 5 to the stepping motor 35 to determine the opening degree of the sealing valve 3. Since the corrected opening degree command amount K2 is calculated based on the pressure difference ΔP between the tank side pressure P1 and the canister side pressure P2, a more appropriately determined opening degree can be realized.

Therefore, even though the valve opening start amount K0, which is the dead zone of the sealing valve 3, changes according to the pressure difference ΔP between the tank side pressure P1 and the canister side pressure P2, by taking into account changes in the pressure difference ΔP, the corrected opening degree command amount K2 transmitted from the opening degree command unit 51 to the stepping motor 35 of the sealing valve 3 can be determined. Due to this, the opening degree of the sealing valve 3 when opening the first purge pipe 41 is more appropriately determined, and the flow rate of the evaporated fuel F1 flowing through the sealing valve 3 is appropriately controlled.

During the first purge operation 501, the flow rate of the evaporated fuel F1 purged from the fuel tank 62 to the canister 2 can be appropriately controlled within a range that does not exceed an allowable adsorption flow rate (i.e., adsorption capacity) of the canister 2 to the adsorbent 22. The allowable adsorption flow rate indicates an upper limit adsorption amount that the adsorbent 22 of the canister 2 can adsorb per unit time with respect to the evaporated fuel F1. Thus, it is possible to prevent evaporated fuel F1 from escaping through to the pressure release port 213 of the canister 2 without being adsorbed by the adsorbent 22.

During the third purge operation 503, it is possible to appropriately control the flow rate of the evaporated fuel F1 purged from the fuel tank 62 to the intake pipe 611 of the internal combustion engine 61 within an allowable variation range of the air-fuel ratio in the internal combustion engine 61. In addition, during both the first purge operation 501 and the third purge operation 503, the flow rate of the evaporated fuel F1 can be appropriately controlled by the sealing valve 3 so that the purge from the fuel tank 62 to the canister 2 or the intake pipe 611 of the internal combustion engine 61 is performed quickly.

Therefore, according to the evaporated fuel processing device 1 of the present embodiment, the purge flow rate of the evaporated fuel F1 from the fuel tank 62 can be more appropriately and quantitatively controlled.

Second Embodiment

Figure 14:
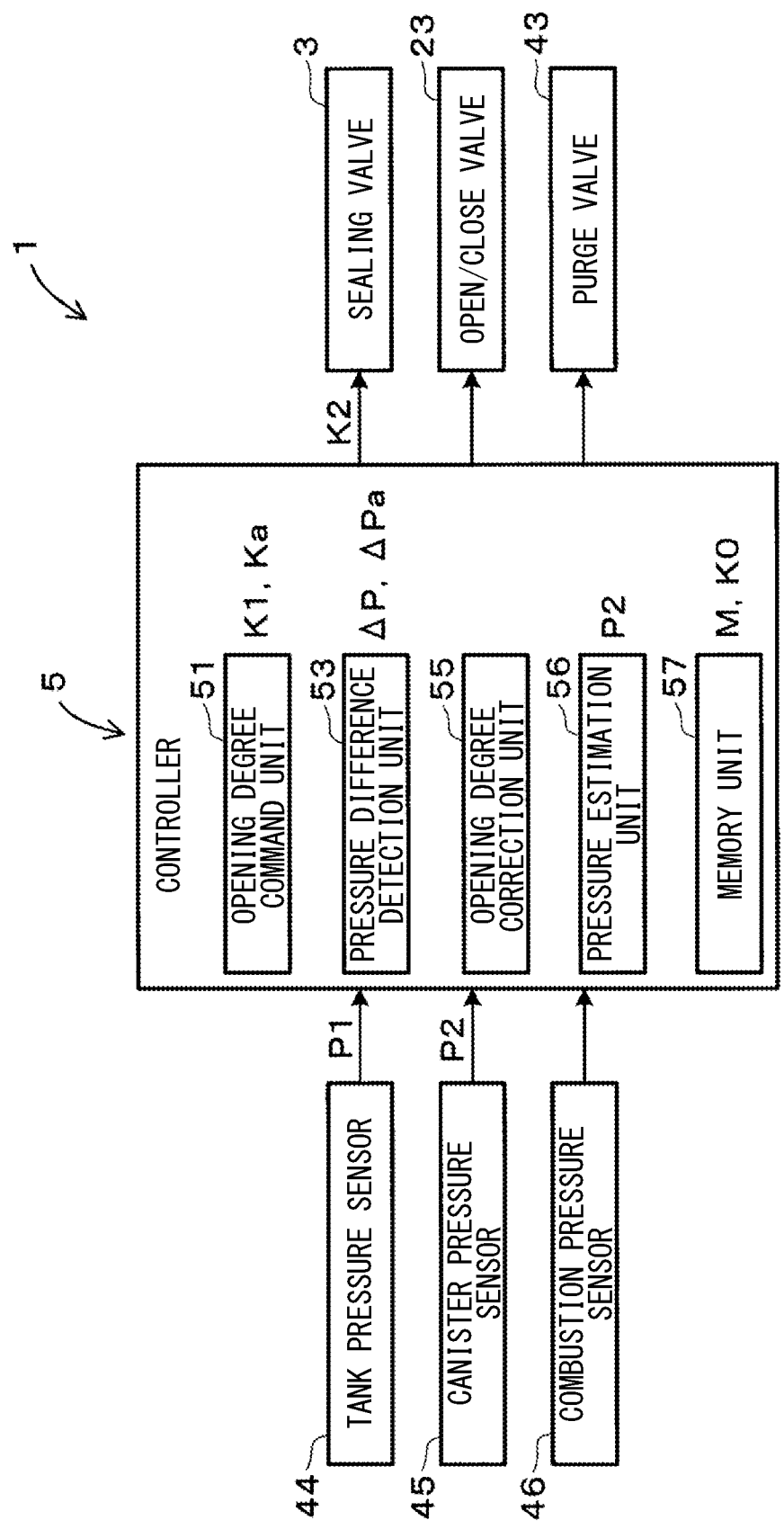
FIG. 14 is an explanatory diagram schematically showing a controller of the evaporated fuel processing device according to a second embodiment.

In the evaporated fuel processing device 1 of this embodiment, when the evaporated fuel processing device 1 is used, the relationship map M between the valve opening start amount K0 and the pressure difference ΔP is not created by the relationship learning unit 54 of the controller 5 during the learning operation 504. Instead, as shown in FIG. 14, the relationship map M is pre-stored in a memory unit 57 of the controller 5 before the use of the evaporated fuel processing device 1. The controller 5 of the present embodiment performs the sealing operation and the first to third purge operations 501, 502, and 503 in the same manner as in the first embodiment, with the exception that the learning operation 504 is not performed.

The controller 5 according to the present embodiment does not include the valve opening detection unit 52 and the relationship learning unit 54 illustrated in the first embodiment, but includes the memory unit 57. The opening degree command unit 51 and the opening degree correction unit 55 of the present embodiment are the same as those in the first embodiment, and the pressure difference detection unit 53 of the present embodiment is configured to detect the pressure difference ΔP when the first purge pipe 41 is opened by the sealing valve 3. The memory unit 57 of the present embodiment stores the relationship map M between the pressure difference ΔP and the valve opening start amount K0. The relationship map M is created by detecting the valve opening start amount K0 as the opening degree command amount K1 when the tank side pressure P1 begins to decrease while the opening degree command amount K1 is gradually increased from zero, for a plurality of different pressure differences ΔP.

The relationship map M in the memory unit 57 is created by learning the relationship between the valve opening start amount K0 and the pressure difference ΔP for a plurality different pressure differences ΔP prior to using the evaporated fuel treatment device 1. This learning is performed during a development test stage before the evaporated fuel processing device 1 is manufactured and used as a product.

Specifically, during the development testing stage of the vehicle 6 on which the evaporated fuel processing device 1 is mounted, the opening degree command amount K1 transmitted from the opening degree command unit 51 to the stepping motor 35 is gradually increased from zero. Next, the controller 5 detects that the opening degree command amount K1 has reached the valve opening start amount K0 when the tank side pressure P1 starts to decrease. The detection of the valve opening start amount K0 is performed for a plurality of different pressure differences ΔP, and the relationship map M between the valve opening start amount K0 and the pressure difference ΔP is created.

In the evaporated fuel processing device 1 according to the present embodiment, it is possible avoid the effort of creating the relationship map M during operation. Therefore, the correction of the opening degree command amount K1 by the opening degree correction unit 55 can be quickly started after the use of the evaporated fuel processing device 1. The configuration, control method, and the like of the evaporated fuel processing device 1 of the present embodiment are the same as those of the first embodiment.

According to the evaporated fuel processing device 1 of the present embodiment as well, the purge flow rate of the evaporated fuel F1 from the fuel tank 62 can be more appropriately and quantitatively controlled. In this embodiment as well, the same operation and effect as in the first embodiment can be obtained. In this embodiment as well, components indicated by the same reference numerals as those in the first embodiment are the same as those in the first embodiment.

Third Embodiment

Figure 15:
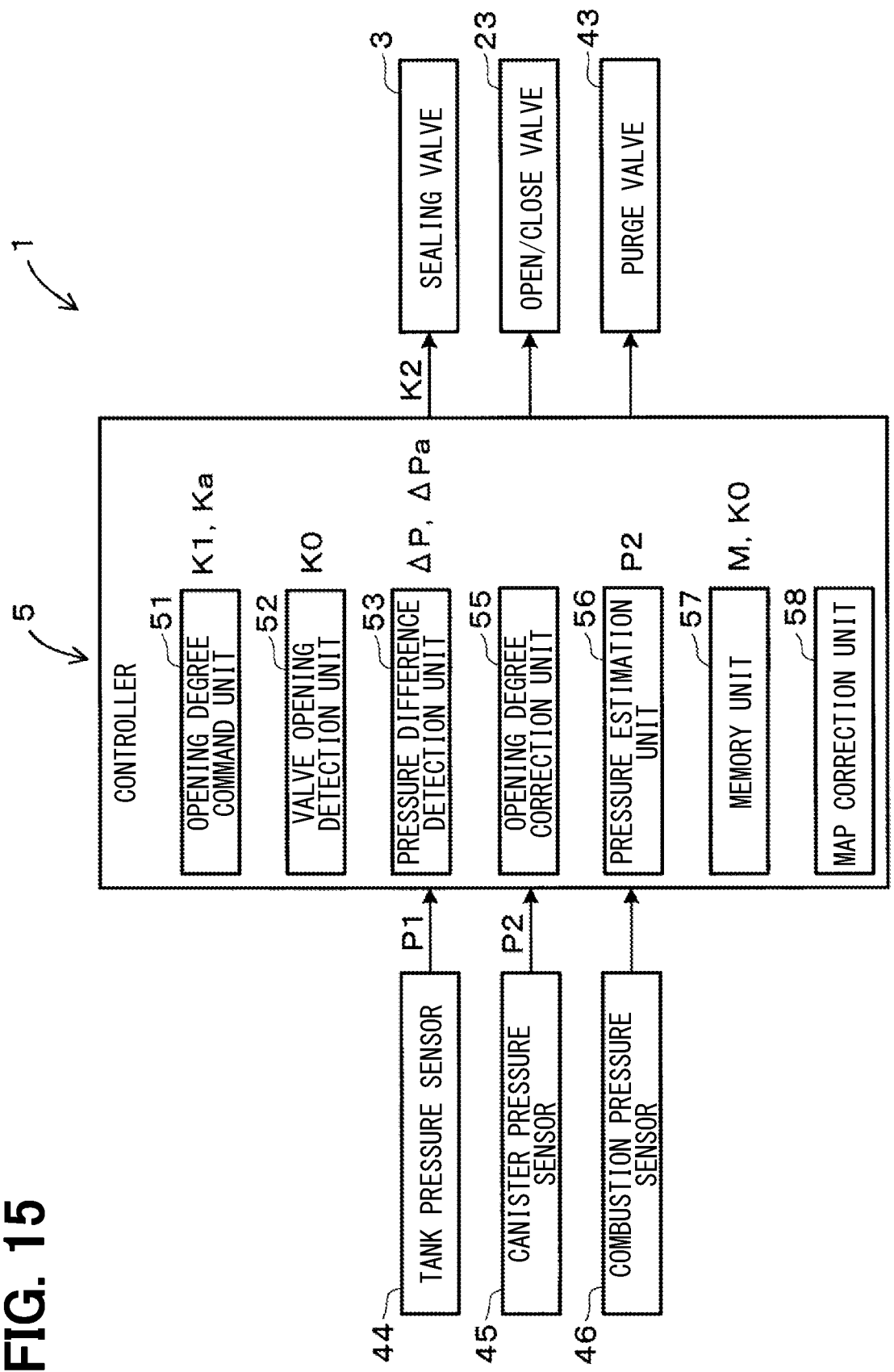
FIG. 15 is an explanatory diagram schematically showing a controller of the evaporated fuel processing device according to a third embodiment.

The evaporated fuel processing device 1 of the present embodiment has a configuration for correcting the relationship map M stored in the memory unit 57 in the evaporated fuel processing device 1 of the second embodiment. More specifically, as shown in FIG. 15, the evaporated fuel processing device 1 of the present embodiment includes the valve opening detection unit 52 described in the first embodiment, and further includes a map correction unit 58 that corrects the relationship map M. The map correction unit 58 is configured to, when the opening degree command amount K1 from the opening degree command unit 51 is gradually increased from zero, determine the opening degree command amount K1 has reached a valve opening start amount K0 when the tank side pressure P1 begins to decrease.

The correction of the relationship map M by the map correction unit 58 is performed by comparing the relationship map M stored in the memory unit 57 and the relationship between the valve opening start amount K0 and the pressure difference ΔP detected by the map correction unit 58 when the evaporated fuel treatment device 1 is used. When there is a difference between the relationship map M and the relationship between the valve opening start amount K0 and the pressure difference ΔP, the relationship map M is adjusted to match the relationship between the valve opening start amount K0 and the pressure difference ΔP, thereby correcting the relationship map M.

The relationship between the valve opening start amount K0 and the pressure difference ΔP by the map correction unit 58 can be detected for a plurality of different pressure differences ΔP. Then, by correcting the relationship map M based on a plurality of different pressure differences ΔP, the accuracy of the correction can be increased.

According to the evaporated fuel processing device 1 of the present embodiment as well, the purge flow rate of the evaporated fuel F1 from the fuel tank 62 can be more appropriately and quantitatively controlled. In this embodiment as well, the same operation and effect as in the first embodiment can be obtained. In this embodiment as well, components indicated by the same reference numerals as those in the first embodiment are the same as those in the first embodiment.

Fourth Embodiment

Figure 16:
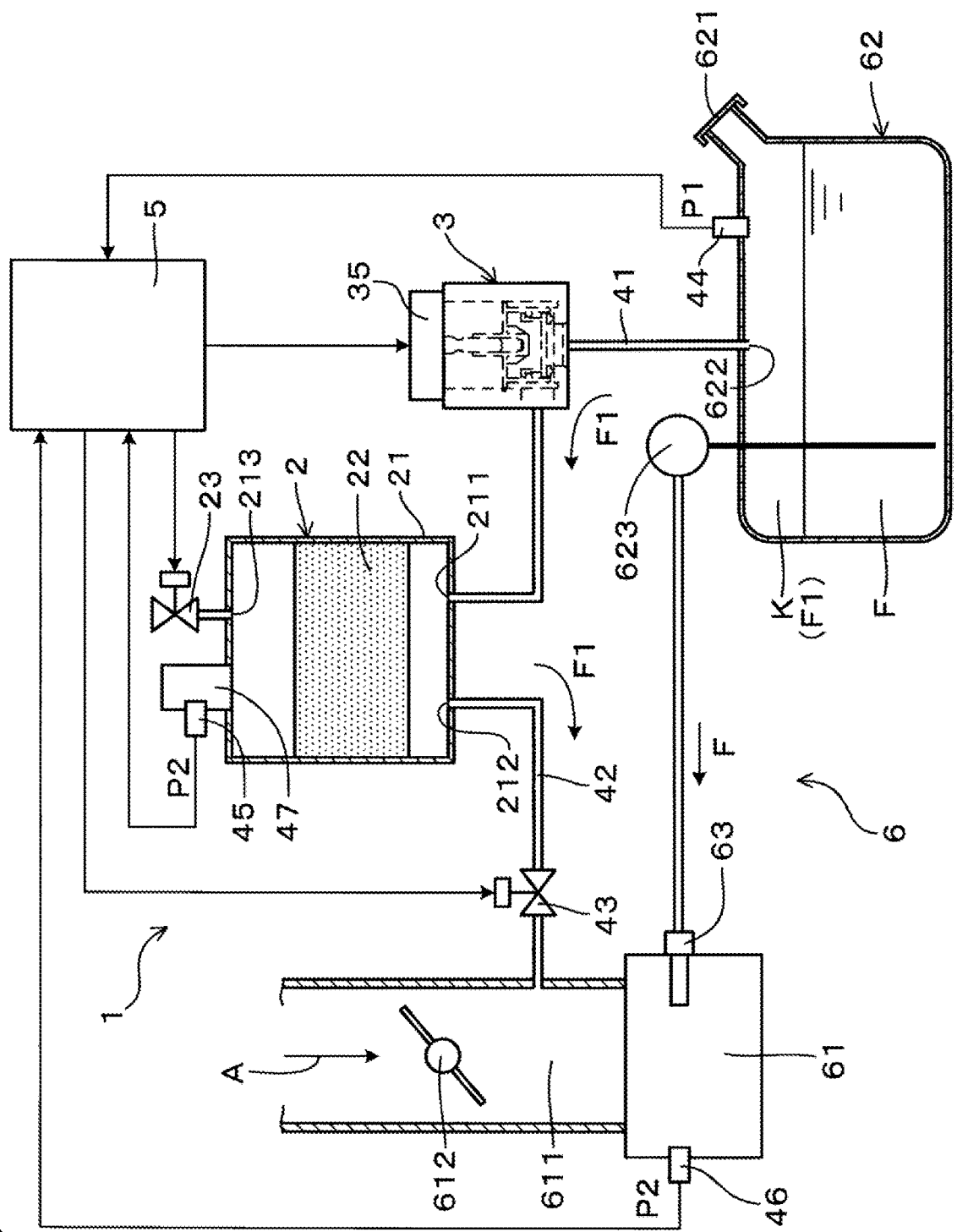
FIG. 16 is an explanatory diagram schematically showing a controller of the evaporated fuel processing device according to a fourth embodiment.

As shown in FIG. 16, the evaporated fuel treatment device 1 of the present embodiment includes a leak check module 47 that sets the pressure in the canister 2 to a negative pressure or a positive pressure to check whether a gas leak has occurred in the canister 2, the sealing valve 3, the first purge pipe 41, the purge valve 43, the second purge pipe 42, etc. The leak check module 47 is disposed in an opening provided in the case 21 of the canister 2 and has a pump or the like that adjusts the pressure in the canister 2 negative or positive. The canister side pressure sensor 45 for detecting the canister side pressure P2 is built in the leak check module 47.

A negative pressure indicates a pressure lower than atmospheric pressure, and a positive pressure indicates a pressure higher than atmospheric pressure. When the pressure in the canister 2 is to be set to a negative pressure, a pressure reducing type leak check module 47 is used, and when the pressure in the canister 2 is to be set to a positive pressure, a pressure increasing type leak check module 47 is used.

Instead of using the canister side pressure sensor 45, the leak check module 47 may detect a change in the pressure in the canister 2 based on a motor current when operating a pump for reducing the pressure in the canister 2 to a negative pressure or increasing the pressure in the canister 2 to a positive pressure. In this case, the canister side pressure P2 is detected by a pressure estimating unit provided in the controller 5 for estimating the pressure based on the motor current.

By using the leak check module 47, each part of the evaporated fuel processing device 1 can be set in a vacuum state or a pressurized state, and the airtightness of the evaporated fuel processing device 1 can be measured based on whether the pressure in the evaporated fuel processing device 1 changes. At the time of the leak check, the inside of the fuel tank 62 can be set to atmospheric pressure, while the inside of the canister 2 can be set to negative pressure or positive pressure. Then, the relationship learning unit 54 can create the relationship map M between the valve opening start amount K0 and the pressure difference ΔP by detecting the valve opening start amount K0 using the valve opening detection unit 52 and detecting the pressure difference ΔP between the tank side pressure P1 and the canister side pressure P2 using the pressure difference detection unit 53. This relationship map M can be used in at least one of the first purge operation 501 and the third purge operation 503.

In the evaporated fuel processing device 1 of the present embodiment, the canister side pressure sensor 45 does not have to be provided separately from the leak check module 47. According to the evaporated fuel processing device 1 of the present embodiment as well, the purge flow rate of the evaporated fuel F1 from the fuel tank 62 can be more appropriately and quantitatively controlled. In this embodiment as well, the same operation and effect as in the first embodiment can be obtained. In this embodiment as well, components indicated by the same reference numerals as those in the first embodiment are the same as those in the first embodiment.

The present disclosure is not limited to each embodiment, and it is possible to configure further different embodiments without departing from the gist of the present disclosure. Further, the present disclosure includes various modifications, modifications within an equivalent range, and the like. Furthermore, combinations, forms, and the like of various components derived from the present disclosure are also included in the technical concept of the present disclosure.

The invention claimed is:

1. An evaporated fuel processing device provided in a vehicle having an internal combustion engine and a fuel tank for processing evaporated fuel evaporated in the fuel tank, comprising:
   a canister including an adsorbent for adsorbing evaporated fuel;
   a sealing valve provided in a first purge pipe connecting the fuel tank to the canister, the sealing valve being configured to be operated by an actuator to quantitatively adjust an opening degree for opening and closing the first purge pipe;
   a tank pressure sensor provided in the fuel tank configured to a tank side pressure in the fuel tank;
   a purge valve provided in a second purge pipe connecting the canister to an intake pipe of the internal combustion engine, the purge valve being configured to open and close the second purge pipe;
   a canister side pressure detector configured to detect or estimate a canister side pressure generated on the canister side with respect to the sealing valve; and
   a controller configured to selectively execute each of:
   a sealing operation in which the first purge pipe is closed by the sealing valve to seal the fuel tank,
   a first purge operation in which the first purge pipe is opened by the sealing valve to purge the evaporated fuel in the fuel tank into the canister,
   a second purge operation in which the second purge pipe is opened by the purge valve to purge fuel components in the canister into the intake pipe, a third purge operation in which the first purge pipe is opened by the sealing valve and at the same time the second purge pipe is opened by the purge valve to purge the evaporated fuel in the fuel tank into the intake pipe via the canister, and a learning operation in which an opening degree of the sealing valve is learned during at least one of the first purge operation or the third purge operation, wherein the controller includes:

an opening degree command unit that transmits an opening degree command amount, which determines the opening degree of the sealing valve, to the actuator, a valve opening detection unit that, while the opening degree command amount is gradually increased from zero, determines the opening degree command amount has reached a valve opening start amount when the tank side pressure begins to decrease, a pressure difference detection unit that detects a pressure difference between the tank side pressure and the canister side pressure when the opening degree command amount reaches the valve opening start amount, and also detects the pressure difference when the first purge pipe is opened by the sealing valve, a relationship learning unit that, during the learning operation, learns a relationship between the valve opening start amount and the pressure difference when the valve opening detection unit detects a plurality of different valve opening start amounts and the pressure difference detection unit detects a plurality of different pressure differences, and then creates a relationship map between the valve opening start amount and the pressure difference, and an opening degree correction unit that, during at least one of the first purge operation or the third purge operation, detects a starting pressure difference as the pressure difference detected by the pressure difference detection unit at the time when the first purge pipe is opened by the sealing valve, checks the starting pressure difference against the relationship map to read a starting valve opening start amount which is the valve opening start amount corresponding to the starting pressure difference, and corrects the opening degree command amount from the opening degree command unit using the starting valve opening start amount.

2. The evaporated fuel processing device according to claim 1, wherein the learning operation of the relationship learning unit is performed during a process of increasing the pressure in the fuel tank while performing the sealing operation.

3. The evaporated fuel processing device according to claim 1, wherein the canister side pressure detector includes a canister pressure sensor provided in the canister and configured to detect pressure in the canister as the canister side pressure during the first purge operation, and a pressure estimation unit included in the controller configured to estimate the canister side pressure based on a combustion pressure of the internal combustion engine during the third purge operation.

4. The evaporated fuel processing device according to claim 1, wherein the opening degree command unit determines the opening degree command amount such that, during the first purge operation and the third purge operation, the evaporated fuel flows at a target flow rate through the sealing valve.

5. An evaporated fuel processing device provided in a vehicle having an internal combustion engine and a fuel tank for processing evaporated fuel evaporated in the fuel tank, comprising:

a canister including an adsorbent for adsorbing evaporated fuel;

a sealing valve provided in a first purge pipe connecting the fuel tank to the canister, the sealing valve being configured to be operated by an actuator to quantitatively adjust an opening degree for opening and closing the first purge pipe;

a tank pressure sensor provided in the fuel tank configured to a tank side pressure in the fuel tank;

a purge valve provided in a second purge pipe connecting the canister to an intake pipe of the internal combustion engine, the purge valve being configured to open and close the second purge pipe;

a canister side pressure detector configured to detect or estimate a canister side pressure generated on the canister side with respect to the sealing valve; and a controller configured to selectively execute each of:

a sealing operation in which the first purge pipe is closed by the sealing valve to seal the fuel tank, a first purge operation in which the first purge pipe is opened by the sealing valve to purge the evaporated fuel in the fuel tank into the canister, a second purge operation in which the second purge pipe is opened by the purge valve to purge fuel components in the canister into the intake pipe, and a third purge operation in which the first purge pipe is opened by the sealing valve and at the same time the second purge pipe is opened by the purge valve to purge the evaporated fuel in the fuel tank into the intake pipe via the canister, wherein the controller includes:

an opening degree command unit that transmits an opening degree command amount, which determines the opening degree of the sealing valve, to the actuator, a pressure difference detection unit that detects a pressure difference between the tank side pressure and the canister side pressure when the first purge pipe is opened by the sealing valve, a memory unit that stores a relationship map between the pressure difference $\Delta P$ and a valve opening start amount, the relationship map being created by detecting the valve opening start amount as the opening degree command amount when the tank side pressure begins to decrease while the opening degree command amount is gradually increased from zero, for a plurality of different pressure differences, and an opening degree correction unit that, during at least one of the first purge operation or the third purge operation, detects a starting pressure difference as the pressure difference detected by the pressure difference detection unit at the time when the first purge pipe is opened by the sealing valve, checks the starting pressure difference against the relationship map to read a starting valve opening start amount which is the valve opening start amount corresponding to the starting pressure difference, and corrects the opening degree command amount from the opening degree command unit using the starting valve opening start amount.

6. The evaporated fuel processing device according to claim 5, further comprising:

a valve opening detection unit that, while the opening degree command amount is gradually increased from zero, determines the opening degree command amount has reached the valve opening start amount when the tank side pressure begins to decrease, and a map correction unit that detects the pressure difference using the pressure difference detection unit when the valve opening detection unit detects the valve opening start amount, and compares this valve opening start amount and this pressure difference with values in the relationship map to correct the relationship map.

7. The evaporated fuel processing device according to claim 5, wherein the canister side pressure detector includes a canister pressure sensor provided in the canister and configured to detect pressure in the canister as the canister side pressure during the first purge operation, and a pressure estimation unit included in the controller configured to estimate the canister side pressure based on a combustion pressure of the internal combustion engine during the third purge operation.

8. The evaporated fuel processing device according to claim 5, wherein the opening degree command unit determines the opening degree command amount such that, during the first purge operation and the third purge operation, the evaporated fuel flows at a target flow rate through the sealing valve.

* * * * *